US00RE47648E

(19) United States
(12) Reissued Patent
Reeve et al.

(10) Patent Number: US RE47,648 E
(45) Date of Reissued Patent: Oct. 15, 2019

(54) INTEGRATED MULTI-SENSOR CONTROL SYSTEM AND METHOD

(71) Applicant: AgJunction LLC, Scottsdale, AZ (US)

(72) Inventors: David R. Reeve, Chapel Hill (AU); Malcolm B. Jones, Bracken Ridge (AU); Andreas F. Ramm, Deception Bay (AU); Aaron C. Stichter, Apache Junction, AZ (US); Joshua M. Gattis, Robinson, KS (US)

(73) Assignee: AGJUNCTION LLC, Hiawatha, KS (US)

(21) Appl. No.: 15/041,784

(22) Filed: Feb. 11, 2016

Related U.S. Patent Documents

Reissue of:
(64) Patent No.: 8,649,930
Issued: Feb. 11, 2014
Appl. No.: 12/884,038
Filed: Sep. 16, 2010

U.S. Applications:
(60) Provisional application No. 61/243,417, filed on Sep. 17, 2009.

(51) Int. Cl.
*B62D 1/02* (2006.01)
*A01B 69/04* (2006.01)
(Continued)

(52) U.S. Cl.
CPC ..... *B62D 1/02* (2013.01); *A01B 69/008* (2013.01); *A01B 79/005* (2013.01); *B62D 1/28* (2013.01);
(Continued)

(58) Field of Classification Search
CPC . B62D 6/00; B62D 1/28; B62D 1/027; G01C 22/00; G05D 1/00; G05D 1/027;
(Continued)

(56) References Cited

U.S. PATENT DOCUMENTS 3,585,537 A 6/1971 Rennick et al.
3,596,228 A 7/1971 Reed, Jr. et al.
(Continued)

FOREIGN PATENT DOCUMENTS

JP 07244150 9/1995
WO WO9836288 8/1998
(Continued)

OTHER PUBLICATIONS

Information Disclosure Statement, Listing of Related Cases, Aug. 2, 2016, 1 page.
(Continued)

*Primary Examiner* — Mark Sager
(74) *Attorney, Agent, or Firm* — Schwabe Williamson & Wyatt

(57) ABSTRACT

A GNSS integrated multi-sensor guidance system for a vehicle assembly includes a suite of sensor units, including a global navigation satellite system (GNSS) sensor unit comprising a receiver and an antenna. An inertial measurement unit (IMU) outputs vehicle dynamic information for combining with the output of the GNSS unit. A controller with a processor receives the outputs of the sensor suite and computes steering solutions, which are utilized by vehicle actuators, including an automatic steering control unit connected to the vehicle steering for guiding the vehicle. The processor is programmed to define multiple behavior-based automatons comprising self-operating entities in the guidance system, which perform respective behaviors using data output from one or more sensor units for achieving the behaviors. A GNSS integrated multi-sensor vehicle guidance method is also disclosed.

14 Claims, 18 Drawing Sheets

(51) Int. Cl.
*G05D 1/02* (2006.01)
*B62D 1/28* (2006.01)
*A01B 79/00* (2006.01)

(52) U.S. Cl.
CPC ..... *G05D 1/027* (2013.01); *G05D 1/0278* (2013.01); *G05D 1/0257* (2013.01); *G05D 1/0274* (2013.01); *G05D 2201/0201* (2013.01)

(58) Field of Classification Search
CPC ..... G05D 1/0278; G05D 1/024; G05D 2201/0201; G05D 1/0257; G05D 1/0274; G05D 1/0246; A01B 79/005
USPC ..... 701/23, 24, 25, 26, 28, 468, 470, 472, 701/475
See application file for complete search history.

(56) References Cited

U.S. PATENT DOCUMENTS 3,727,710 A 4/1973 Sanders et al.
3,815,272 A 6/1974 Marleau
3,899,028 A 8/1975 Morris et al.
3,987,456 A 10/1976 Gelin
4,132,272 A 1/1979 Holloway et al.
4,170,776 A 10/1979 MacDoran et al.
4,180,133 A 12/1979 Collogan et al.
4,398,162 A 8/1983 Nagai
4,453,614 A 6/1984 Allen et al.
4,529,990 A 7/1985 Brunner
4,637,474 A 1/1987 Leonard
4,667,203 A 5/1987 Counselman, III
4,689,556 A 8/1987 Cedrone
4,694,264 A 9/1987 Owens et al.
4,710,775 A 12/1987 Coe
4,714,435 A 12/1987 Stipanuk et al.
4,739,448 A 4/1988 Rowe et al.
4,751,512 A 6/1988 Longaker
4,769,700 A 9/1988 Pryor
4,785,463 A 11/1988 Janc et al.
4,802,545 A 2/1989 Nystuen et al.
4,812,991 A 3/1989 Hatch
4,813,991 A 3/1989 Hale
4,858,132 A 8/1989 Holmquist
4,864,320 A 9/1989 Munson et al.
4,894,662 A 1/1990 Counselman
4,916,577 A 4/1990 Dawkins
4,918,607 A 4/1990 Wible
4,963,889 A 10/1990 Hatch
5,031,704 A 7/1991 Fleischer et al.
5,100,229 A 3/1992 Lundberg et al.
5,134,407 A 7/1992 Lorenz et al.
5,148,179 A 9/1992 Allison
5,152,347 A 10/1992 Miller
5,155,490 A 10/1992 Spradley et al.
5,155,493 A 10/1992 Thursby et al.
5,156,219 A 10/1992 Schmidt et al.
5,165,109 A 11/1992 Han et al.
5,173,715 A 12/1992 Rodal et al.
5,177,489 A 1/1993 Hatch
5,185,610 A 2/1993 Ward et al.
5,191,351 A 3/1993 Hofer et al.
5,194,851 A 3/1993 Kraning et al.
5,202,829 A 4/1993 Geier
5,207,239 A 5/1993 Schwitalla
5,239,669 A 8/1993 Mason et al.
5,255,756 A 10/1993 Follmer et al.
5,268,695 A 12/1993 Dentinger et al.
5,293,170 A 3/1994 Lorenz et al.
5,294,970 A 3/1994 Dornbusch et al.
5,296,861 A 3/1994 Knight
5,311,149 A 5/1994 Wagner et al.
5,323,322 A 6/1994 Mueller et al.
5,334,987 A 8/1994 Teach
5,343,209 A 8/1994 Sennott et al.
5,345,245 A 9/1994 Ishikawa et al.
5,359,332 A 10/1994 Allison et al.
5,361,212 A 11/1994 Class et al.
5,365,447 A 11/1994 Dennis
5,369,589 A 11/1994 Steiner
5,375,059 A 12/1994 Kyrtsos et al.
5,390,124 A 2/1995 Kyrtsos
5,390,125 A 2/1995 Sennott et al.
5,390,207 A 2/1995 Fenton et al.
5,416,712 A 5/1995 Geier et al.
5,430,654 A * 7/1995 Kyrtsos et al. ..... 701/470
5,442,363 A 8/1995 Remondi
5,444,453 A 8/1995 Lalezari
5,451,964 A 9/1995 Babu
5,467,282 A 11/1995 Dennis
5,471,217 A 11/1995 Hatch et al.
5,476,147 A 12/1995 Fixemer
5,477,228 A 12/1995 Tiwari et al.
5,477,458 A 12/1995 Loomis
5,490,073 A 2/1996 Kyrtsos
5,491,636 A 2/1996 Robertson
5,495,257 A 2/1996 Loomis
5,504,482 A 4/1996 Schreder
5,511,623 A 4/1996 Frasier
5,519,620 A 5/1996 Talbot et al.
5,521,610 A 5/1996 Rodal
5,523,761 A 6/1996 Gildea
5,534,875 A 7/1996 Diefes et al.
5,543,804 A 8/1996 Buchler et al.
5,546,093 A 8/1996 Gudat et al.
5,548,293 A 8/1996 Cohen et al.
5,561,432 A 10/1996 Knight
5,563,786 A 10/1996 Torii
5,568,152 A 10/1996 Janky et al.
5,568,162 A 10/1996 Samsel et al.
5,583,513 A 12/1996 Cohen
5,589,835 A 12/1996 Gildea et al.
5,592,382 A 1/1997 Colley
5,596,328 A 1/1997 Stangeland et al.
5,600,670 A 2/1997 Turney
5,604,506 A 2/1997 Rodal
5,608,393 A 3/1997 Hartman
5,610,522 A 3/1997 Locatelli et al.
5,610,616 A 3/1997 Vallot et al.
5,610,845 A 3/1997 Slabinski et al.
5,612,883 A 3/1997 Shaffer et al.
5,615,116 A 3/1997 Gudat et al.
5,617,100 A 4/1997 Akiyoshi et al.
5,617,317 A 4/1997 Ignagni
5,621,646 A 4/1997 Enge et al.
5,638,077 A 6/1997 Martin
5,644,139 A 7/1997 Allen et al.
5,646,844 A * 7/1997 Gudat et al. ..... 701/409
5,663,879 A 9/1997 Trovato et al.
5,664,632 A 9/1997 Frasier
5,673,491 A 10/1997 Brenna et al.
5,680,140 A 10/1997 Loomis
5,684,476 A * 11/1997 Anderson ..... 340/988
5,684,696 A 11/1997 Rao et al.
5,706,015 A 1/1998 Chen et al.
5,717,593 A 2/1998 Gvili
5,725,230 A 3/1998 Walkup
5,731,786 A 3/1998 Abraham et al.
5,739,785 A 4/1998 Allison et al.
5,757,316 A 5/1998 Buchler
5,765,123 A 6/1998 Nimura et al.
5,777,578 A 7/1998 Chang et al.
5,810,095 A 9/1998 Orbach et al.
5,828,336 A 10/1998 Yunck et al.
5,838,562 A 11/1998 Gudat et al.
5,854,987 A 12/1998 Sekine et al.
5,862,501 A 1/1999 Talbot et al.
5,864,315 A 1/1999 Welles et al.
5,864,318 A 1/1999 Cosenza et al.
5,875,408 A 2/1999 Bendett et al.
5,877,725 A 3/1999 Kalafus
5,890,091 A 3/1999 Talbot et al.
5,899,957 A 5/1999 Loomis
5,906,645 A 5/1999 Kagawa et al.

(56) References Cited

U.S. PATENT DOCUMENTS 5,912,798 A 6/1999 Chu
5,914,685 A 6/1999 Kozlov et al.
5,917,448 A 6/1999 Mickelson
5,918,558 A 7/1999 Susag
5,919,242 A 7/1999 Greatline et al.
5,923,270 A 7/1999 Sampo et al.
5,926,079 A 7/1999 Heine et al.
5,927,603 A 7/1999 McNabb
5,928,309 A 7/1999 Korver et al.
5,929,721 A 7/1999 Munn et al.
5,933,110 A 8/1999 Tang
5,935,183 A 8/1999 Sahm et al.
5,936,573 A 8/1999 Smith
5,940,026 A 8/1999 Popeck
5,941,317 A 8/1999 Mansur
5,943,008 A 8/1999 Van Dusseldorp
5,944,770 A 8/1999 Enge et al.
5,945,917 A 8/1999 Harry
5,948,043 A * 9/1999 Mathis ..... 701/446
5,949,371 A 9/1999 Nichols
5,955,973 A * 9/1999 Anderson ..... 340/988
5,956,250 A 9/1999 Gudat et al.
5,969,670 A 10/1999 Kalafus et al.
5,987,383 A 11/1999 Keller et al.
6,014,101 A 1/2000 Loomis
6,014,608 A 1/2000 Seo
6,018,313 A 1/2000 Engelmayer et al.
6,023,239 A 2/2000 Kovach
6,052,647 A * 4/2000 Parkinson et al. ..... 701/23
6,055,477 A 4/2000 McBurney et al.
6,057,800 A 5/2000 Yang et al.
6,061,390 A 5/2000 Meehan et al.
6,061,632 A 5/2000 Dreier
6,062,317 A 5/2000 Gharsalli
6,069,583 A 5/2000 Silvestrin et al.
6,070,673 A 6/2000 Wendte
6,076,612 A 6/2000 Carr et al.
6,081,171 A 6/2000 Ella
6,100,842 A 8/2000 Dreier et al.
6,122,595 A 9/2000 Varley et al.
6,128,574 A 10/2000 Diekhans
6,144,335 A 11/2000 Rogers
6,191,730 B1 2/2001 Nelson, Jr.
6,191,733 B1 2/2001 Dizchavez
6,198,430 B1 3/2001 Hwang et al.
6,198,992 B1 3/2001 Winslow
6,199,000 B1 3/2001 Keller et al. ..... A01B 79/005 701/50
6,205,401 B1 3/2001 Pickhard et al.
6,212,453 B1 4/2001 Kawagoe et al.
6,215,828 B1 4/2001 Signell et al.
6,229,479 B1 5/2001 Kozlov et al.
6,230,097 B1 5/2001 Dance et al.
6,233,511 B1 5/2001 Berger et al.
6,236,916 B1 5/2001 Staub et al.
6,236,924 B1 5/2001 Motz
6,253,160 B1 6/2001 Hanseder
6,256,583 B1 7/2001 Sutton
6,259,398 B1 7/2001 Riley
6,266,595 B1 7/2001 Greatline et al.
6,285,320 B1 9/2001 Olster et al.
6,292,132 B1 9/2001 Wilson
6,307,505 B1 10/2001 Green
6,313,788 B1 11/2001 Wilson
6,314,348 B1 11/2001 Winslow
6,325,684 B1 12/2001 Knight
6,336,066 B1 1/2002 Pellenc et al.
6,345,231 B2 2/2002 Quincke
6,356,602 B1 3/2002 Rodal et al.
6,377,889 B1 4/2002 Soest
6,380,888 B1 4/2002 Kucik
6,389,345 B2 5/2002 Phelps
6,392,589 B1 5/2002 Rogers et al.
6,397,147 B1 5/2002 Whitehead
6,415,229 B1 7/2002 Diekhans
6,418,031 B1 7/2002 Archambeault
6,421,003 B1 7/2002 Riley et al.
6,424,915 B1 7/2002 Fukuda et al.
6,431,576 B1 8/2002 Viaud et al.
6,434,462 B1 8/2002 Bevly et al.
6,445,983 B1 9/2002 Dickson et al.
6,445,990 B1 9/2002 Manring
6,449,558 B1 9/2002 Small
6,463,091 B1 10/2002 Zhodzicshsky et al.
6,463,374 B1 10/2002 Keller et al.
6,466,871 B1 10/2002 Reisman et al.
6,469,663 B1 10/2002 Whitehead et al.
6,484,097 B2 11/2002 Fuchs et al.
6,501,422 B1 12/2002 Nichols
6,515,619 B1 2/2003 McKay, Jr.
6,516,271 B2 2/2003 Upadhyaya et al.
6,539,303 B2 3/2003 McClure et al.
6,542,077 B2 4/2003 Joao
6,549,835 B2 4/2003 Deguchi
6,553,299 B1 4/2003 Keller et al.
6,553,300 B2 4/2003 Ma et al.
6,553,311 B2 4/2003 Aheam et al.
6,570,534 B2 5/2003 Cohen et al.
6,577,952 B2 6/2003 Strother et al.
6,587,761 B2 7/2003 Kumar
6,606,542 B2 8/2003 Hauwiller et al.
6,611,228 B2 8/2003 Toda et al.
6,611,754 B2 8/2003 Klein
6,611,755 B1 8/2003 Coffee et al.
6,622,091 B2 9/2003 Perlmutter et al. .. G01C 21/165 701/472
6,631,916 B1 10/2003 Miller
6,643,576 B1 * 11/2003 O Connor et al. ..... 701/50
6,646,603 B2 11/2003 Dooley et al.
6,657,875 B1 12/2003 Zeng et al.
6,671,587 B2 12/2003 Hrovat et al.
6,688,403 B2 2/2004 Bernhardt et al.
6,703,973 B1 3/2004 Nichols
6,711,501 B2 3/2004 McClure et al.
6,721,638 B2 4/2004 Zeitler
6,732,024 B2 * 5/2004 Wilhelm Rekow et al. ... 701/26
6,744,404 B1 6/2004 Whitehead et al.
6,754,584 B2 6/2004 Pinto et al.
6,774,843 B2 8/2004 Takahashi
6,789,014 B1 9/2004 Rekow et al.
6,792,380 B2 9/2004 Toda
6,819,269 B2 11/2004 Flick
6,819,780 B2 11/2004 Benson et al.
6,822,314 B2 11/2004 Beasom
6,865,465 B2 3/2005 McClure
6,865,484 B2 3/2005 Miyasaka et al.
6,876,920 B1 4/2005 Mailer
6,900,992 B2 5/2005 Kelly et al.
6,922,635 B2 7/2005 Rorabaugh
6,931,233 B1 8/2005 Tso et al.
6,967,538 B2 11/2005 Woo
6,990,399 B2 1/2006 Hrazdera et al.
7,006,032 B2 2/2006 King et al.
7,026,982 B2 4/2006 Toda et al.
7,027,918 B2 4/2006 Zimmerman et al.
7,031,725 B2 4/2006 Rorabaugh
7,089,099 B2 8/2006 Shostak et al.
7,142,956 B2 11/2006 Heiniger et al.
7,162,348 B2 1/2007 McClure et al.
7,191,061 B2 3/2007 McKay et al.
7,225,060 B2 * 5/2007 O'Connor et al. ..... 701/1
7,225,068 B2 * 5/2007 Schick et al. ..... 701/41
7,231,290 B2 6/2007 Steichen et al.
7,248,211 B2 7/2007 Hatch et al.
7,271,766 B2 9/2007 Zimmerman et al.
7,277,784 B2 10/2007 Weiss
7,277,792 B2 10/2007 Overschie
7,292,186 B2 11/2007 Miller et al.
7,324,915 B2 1/2008 Altman et al.
7,358,896 B2 4/2008 Gradincic et al.
7,373,231 B2 5/2008 McClure et al.
7,388,539 B2 6/2008 Whitehead et al.
7,395,769 B2 7/2008 Jensen
7,428,259 B2 9/2008 Wang et al.

(56) References Cited

U.S. PATENT DOCUMENTS

| | | | | |
|---|---|---|---|---|
| 7,437,230 | B2 | 10/2008 | McClure et al. | |
| 7,451,030 | B2 | 11/2008 | Eglington et al. | |
| 7,454,290 | B2 * | 11/2008 | Alban et al. | 701/472 |
| 7,460,942 | B2 | 12/2008 | Mailer | |
| 7,479,900 | B2 | 1/2009 | Horstemeyer | |
| 7,505,848 | B2 | 3/2009 | Flann et al. | |
| 7,522,100 | B2 | 4/2009 | Yang et al. | |
| 7,571,029 | B2 | 8/2009 | Dai et al. | |
| 7,580,783 | B2 * | 8/2009 | Dix | 701/50 |
| 7,689,354 | B2 | 3/2010 | Heiniger et al. | |
| 7,904,226 | B2 * | 3/2011 | Dix | 701/50 |
| 8,160,765 | B2 * | 4/2012 | Morselli et al. | 701/25 |
| 8,190,337 | B2 | 5/2012 | McClure | |
| 8,437,901 | B2 * | 5/2013 | Anderson | 701/23 |
| 8,649,930 | B2 | 2/2014 | Reeve et al. | |
| 2002/0004691 | A1 * | 1/2002 | Kinashi et al. | 701/4 |
| 2002/0072850 | A1 | 6/2002 | McClure et al. | |
| 2003/0014171 | A1 | 1/2003 | Ma et al. | |
| 2003/0187560 | A1 | 10/2003 | Keller et al. | |
| 2003/0208319 | A1 | 11/2003 | Ell et al. | |
| 2004/0039514 | A1 | 2/2004 | Steichen et al. | |
| 2004/0186644 | A1 | 9/2004 | McClure et al. | |
| 2004/0212533 | A1 | 10/2004 | Whitehead et al. | |
| 2005/0080559 | A1 | 4/2005 | Ishibashi et al. | |
| 2005/0114023 | A1 * | 5/2005 | Williamson et al. | 701/214 |
| 2005/0165546 | A1 * | 7/2005 | Aral | 701/209 |
| 2005/0225955 | A1 | 10/2005 | Grebenkemper et al. | |
| 2005/0265494 | A1 | 12/2005 | Goodings | |
| 2006/0167600 | A1 | 7/2006 | Nelson et al. | |
| 2006/0206246 | A1 | 9/2006 | Walker | |
| 2006/0215739 | A1 | 9/2006 | Williamson et al. | |
| 2007/0078570 | A1 | 4/2007 | Dai et al. | |
| 2007/0088447 | A1 | 4/2007 | Stothert et al. | |
| 2007/0121708 | A1 | 5/2007 | Simpson | |
| 2007/0205940 | A1 | 9/2007 | Yang et al. | |
| 2007/0285308 | A1 | 12/2007 | Bauregger et al. | |
| 2008/0039991 | A1 * | 2/2008 | May et al. | 701/25 |
| 2008/0059068 | A1 * | 3/2008 | Strelow et al. | 701/214 |
| 2008/0129586 | A1 | 6/2008 | Martin | |
| 2008/0195268 | A1 * | 8/2008 | Sapilewski et al. | 701/23 |
| 2008/0204312 | A1 | 8/2008 | Euler | |
| 2009/0171583 | A1 | 7/2009 | DiEsposti | |
| 2009/0174597 | A1 | 7/2009 | DiLellio et al. | |
| 2009/0174622 | A1 | 7/2009 | Kanou | |
| 2009/0177395 | A1 | 7/2009 | Stelpstra | |
| 2009/0177399 | A1 | 7/2009 | Park et al. | |
| 2009/0259397 | A1 | 10/2009 | Stanton | |
| 2009/0259707 | A1 | 10/2009 | Martin et al. | |
| 2009/0262014 | A1 | 10/2009 | DiEsposti | |
| 2009/0262018 | A1 | 10/2009 | Vasilyev et al. | |
| 2009/0262974 | A1 | 10/2009 | Lithopoulos | |
| 2009/0265054 | A1 | 10/2009 | Basnayake | |
| 2009/0265101 | A1 | 10/2009 | Jow | |
| 2009/0265104 | A1 | 10/2009 | Shroff | |
| 2009/0273372 | A1 | 11/2009 | Brenner | |
| 2009/0273513 | A1 | 11/2009 | Huang | |
| 2009/0274079 | A1 | 11/2009 | Bhatia et al. | |
| 2009/0274113 | A1 | 11/2009 | Katz | |
| 2009/0276155 | A1 | 11/2009 | Jeerage et al. | |
| 2009/0295633 | A1 | 12/2009 | Pinto et al. | |
| 2009/0295634 | A1 | 12/2009 | Yu et al. | |
| 2009/0299550 | A1 | 12/2009 | Baker | |
| 2009/0322597 | A1 | 12/2009 | Medina Herrero et al. | |
| 2009/0322598 | A1 | 12/2009 | Fly et al. | |
| 2009/0322600 | A1 | 12/2009 | Whitehead et al. | |
| 2009/0322601 | A1 | 12/2009 | Ladd et al. | |
| 2009/0322606 | A1 | 12/2009 | Gronemeyer | |
| 2009/0326809 | A1 | 12/2009 | Colley et al. | |
| 2010/0013703 | A1 | 1/2010 | Tekawy et al. | |
| 2010/0026569 | A1 | 2/2010 | Amidi | |
| 2010/0030470 | A1 | 2/2010 | Wang et al. | |
| 2010/0039316 | A1 | 2/2010 | Gronemeyer et al. | |
| 2010/0039318 | A1 | 2/2010 | Kmiecik | |
| 2010/0039320 | A1 | 2/2010 | Boyer et al. | |
| 2010/0039321 | A1 | 2/2010 | Abraham | |
| 2010/0060518 | A1 | 3/2010 | Bar-Sever et al. | |
| 2010/0063649 | A1 | 3/2010 | Wu | |
| 2010/0084147 | A1 | 4/2010 | Aral | |
| 2010/0085249 | A1 | 4/2010 | Ferguson et al. | |
| 2010/0085253 | A1 | 4/2010 | Ferguson et al. | |
| 2010/0103033 | A1 | 4/2010 | Roh | |
| 2010/0103034 | A1 | 4/2010 | Tobe et al. | |
| 2010/0103038 | A1 | 4/2010 | Yeh et al. | |
| 2010/0103040 | A1 | 4/2010 | Broadbent | |
| 2010/0106414 | A1 | 4/2010 | Whitehead | |
| 2010/0106445 | A1 | 4/2010 | Kondoh | |
| 2010/0109944 | A1 | 5/2010 | Whitehead et al. | |
| 2010/0109945 | A1 | 5/2010 | Roh | |
| 2010/0109947 | A1 | 5/2010 | Rintanen | |
| 2010/0109948 | A1 | 5/2010 | Razoumov et al. | |
| 2010/0109950 | A1 | 5/2010 | Roh | |
| 2010/0111372 | A1 | 5/2010 | Zheng et al. | |
| 2010/0114483 | A1 | 5/2010 | Heo et al. | |
| 2010/0117894 | A1 | 5/2010 | Velde et al. | |
| 2010/0117899 | A1 | 5/2010 | Papadimitratos et al. | |
| 2010/0117900 | A1 | 5/2010 | Van Diggelen et al. | |
| 2010/0124210 | A1 | 5/2010 | Lo | |
| 2010/0124212 | A1 | 5/2010 | Lo | |
| 2010/0134354 | A1 | 6/2010 | Lennen | |
| 2010/0149025 | A1 | 6/2010 | Meyers et al. | |
| 2010/0149030 | A1 | 6/2010 | Verma et al. | |
| 2010/0149033 | A1 | 6/2010 | Abraham | |
| 2010/0149034 | A1 | 6/2010 | Chen | |
| 2010/0149037 | A1 | 6/2010 | Cho | |
| 2010/0150284 | A1 | 6/2010 | Fielder et al. | |
| 2010/0152949 | A1 | 6/2010 | Nunan et al. | |
| 2010/0156709 | A1 | 6/2010 | Zhang et al. | |
| 2010/0156712 | A1 | 6/2010 | Pisz et al. | |
| 2010/0156718 | A1 | 6/2010 | Chen | |
| 2010/0159943 | A1 | 6/2010 | Salmon | |
| 2010/0161179 | A1 | 6/2010 | McClure et al. | |
| 2010/0161211 | A1 | 6/2010 | Chang | |
| 2010/0161568 | A1 | 6/2010 | Xiao | |
| 2010/0171660 | A1 | 7/2010 | Shyr et al. | |
| 2010/0171757 | A1 | 7/2010 | Melamed | |
| 2010/0185364 | A1 | 7/2010 | McClure | |
| 2010/0185366 | A1 | 7/2010 | Heiniger et al. | |
| 2010/0185389 | A1 | 7/2010 | Woodard | |
| 2010/0188285 | A1 | 7/2010 | Collins | |
| 2010/0188286 | A1 | 7/2010 | Bickerstaff et al. | |
| 2010/0189163 | A1 | 7/2010 | Burgi et al. | |
| 2010/0207811 | A1 | 8/2010 | Lackey | |
| 2010/0210206 | A1 | 8/2010 | Young | |
| 2010/0211248 | A1 | 8/2010 | Craig et al. | |
| 2010/0211315 | A1 | 8/2010 | Toda | |
| 2010/0211316 | A1 | 8/2010 | DaSilva et al. | |

FOREIGN PATENT DOCUMENTS

| | | |
|---|---|---|
| WO | WO0024239 | 5/2000 |
| WO | WO03019430 | 3/2003 |
| WO | WO2005/119386 | 12/2005 |
| WO | WO2009/066183 | 5/2009 |
| WO | WO2009126587 | 10/2009 |
| WO | WO2009/148638 | 12/2009 |

OTHER PUBLICATIONS

Noh, Kwang-Mo, Self-tuning controller for farm tractor guidance, Iowa State University Retrospective Theses and Dissertations, Paper 9874, (1990).

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

Parkinson, Bradford W., et al., "Global Positioning System: Theory and Applications, vol. II", Bradford W. Parkinson and James J. Spiker, Jr., eds., Global Postioning System: Theory and Applicaitons, vol. II, 1995, AIAA, Reston, VA, USA, pp. 3-50, (1995), 3-50.

"Orthman Manufacturing Co., www.orthman.com/htm;guidance.htm", 2004 regarding the "Tracer Quick-Hitch".

Lin, Dai et al., "Real-time Attitude Determination fro Microsatellite by Lamda Method Combined with Kalman Filtering", *A Collection*

(56) References Cited

OTHER PUBLICATIONS

*fof the 22nd AIAA International Communications Satellite Systems Conference and Exhibit Technical Paers* vol. 1, Monetrey, California American Institute of Aeronautics and Astronautics, Inc., (May 2004),136-143.
Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware* (EH'02), (2002).
Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.
Park, Chansik et al., "Integer Ambiguity Resolution for GPS Based Attitude Determination System", *SICE 1998*, Jul. 29-31, Chiba, 1115-1120.
Last, J. D., et al., "Effect of skywave interference on coverage of radiobeacon DGPS Stations", *IEEE Proc.—Radar, Sonar Navig.*, vol. 144, No. 3, Jun. 1997, pp. 163-168.
"International Search Report and Written Opinion", PCT/US2004/015678, filed May 17, 2004, Jun. 21, 2005.
"ISO", 11783 Part 7 Draft Amendment 1 Annex, Paragraphs B.6 and B.7.ISO 11783-7 2004 DAM1, *ISO*: Mar. 8, 2004.
Kaplan, E D., "Understanding GPS: Principles and Applications", *Artech House*, MA, 1996.
Irsigler, M et al., "PPL Tracking Performance in the Presence of Oscillator Phase Noise", *GPS Solutions*, vol. 5, No. 4, pp. 45-57 (2002).
Ward, Phillip W., "Performance Comparisons Between FLL, PLL and a Novel FLL-Assisted-PLL Carrier Tracking Loop Under RF Interference Conditions", *11th Int. Tech Meeting of the Satellite Division of the U.S. Inst. of Navigation*, Nashville, TN, Sep. 15-18, 783-795, 1998.
Bevly, David M., "Comparison of INS v. Carrier-Phase DGPS for Attitude Determination in the Control of Off-Road Vehicles", *ION 55th Annual Meeting*; Jun. 28-30, 1999; Cambridge, Massachusetts; pp. 497-504.
"International Search Report and Written Opinion", *International Searching Authortiy*, PCT/US08/88070, Feb. 9, 2009.
Keicher, R. et al., "Automatic Guidance for Agricultural Vehicles in Europe", *Computers and Electronics in Agriculture*, vol. 25, (Jan. 2000),169-194.
Takac, Frank et al., "SmartRTK: A Novel Method of Processing Standardised RTCM Network TRK Information For High Precision Positioning", *Proceedings of ENC GNSS 2008*, Toulouse, France,(Apr. 22, 2008).
"International Search Report", PCT/US09/33567, (Feb. 9, 2009).
"International Search Report", PCT/US09/49776, (Aug. 11, 2009).
"International Search Report", PCT/AU/2008/000002, (Feb. 28, 2008).
"International Search Report and Written Opinion", PCT/IB2008/003796 (Jul. 15, 2009).
"International Search Report", PCT/US09/33693, (Mar. 30, 2009).
"International Search Report", PCT/US09/039686, (May 26, 2009).
"International Search Report", PCT/US09/34376, (Nov. 2, 2009).
"International Search Report / Written Opinion", PCT/US09/63594, (Jan. 11, 2010).
"International Search Report", PCT/US09/60668, (Dec. 9, 2009).
"International Search Report", PCT/US09/067693, (Jan. 26, 2010).
"International Search Report and Written Opinion", PCT/US10/21334, (Mar. 12, 2010).
Rho, Hyundho et al., "Dual-Frequency GPS Precise Point Positioning with WADGPS Corrections", [retrieved on May 18, 2010]. Retrieved from the Internet: ,URL: http://gauss.gge.unb.ca/papers.pdf/iongnss2005.rho.wadgps.pdf, (Jul. 12, 2006).
"Eurocontrol, Pegasus Technical Notes on SBAS", report [online], Dec. 7, 2004 [retrieved on May 18, 2010]. Retrieved from the Internet: <URL: http://vvww.icao.int/icao/en/ro/nacc/meetings/2004/gnss/documentation/Pegasus/tn.pdf>, (Dec. 7, 2004),p. 89 paras [0001]-[0004].
"ARINC Engineering Services, Interface Specification IS-GPS-200, Revision D", Online [retrieved on May 18, 2010]. Retrieved from the Internet<URL: http://www.navcen.uscg.gov/gps/geninfo/IS-GPS-200D.pdf>, (Dec. 7, 2004),p. 168 para [0001].
Schaer, et al., "Determination and Use of GPS Differential Code Bias Values", Presentation [online]. Revtrieved May 18, 2010. Retrieved from the internet:.<http://nng.esoc.esa.de/ws2006/REPR2.pdf> (May 8, 2006).
"International Search Report", PCT/US10/26509 (Apr. 20, 2010).

* cited by examiner

AMENDED SHEET

AMENDED SHEET

AFTERMARKET HYD. KIT

INTEGRATED MULTI-SENSOR CONTROL SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

[This application relates to U.S. Provisional Patent Application Ser. No. 61/243,417, filed Sep. 17, 2009, filed concurrently herewith, which is incorporated herein by reference.]

*The present application is a reissue application of U.S. Pat. No. 8,649,930, issued Feb. 11, 2014, entitled: GNSS INTEGRATED MULTI-SENSOR CONTROL SYSTEM AND METHOD; which claims benefit of U.S. Provisional Patent Application No. 61/243,417, filed Sep. 17, 2009, the contents and disclosures of which are hereby incorporated by reference in their entireties.*

BACKGROUND OF THE INVENTION

1. Field of the Invention

The present invention relates generally to a versatile integrated multi-sensor apparatus which combines positional data from a variety of sensor types including a GNSS system. The various sensor data is ranked according to its confidence level, and using that data as a means to automatically create a planned path and steer a vehicle along that planned path. Elements of the present invention allow the system to be easily interchangeable among a multitude of vehicles and to communicate with other vehicles to allow for autonomous cooperative vehicle behavior building and task delegation.

2. Description of the Related Art

Global navigation satellite system (GNSS) guidance and control are widely used for vehicle and personal navigation and a variety of other uses involving precision location in geodesic reference systems. GNSS, which includes the Global Positioning System (GPS) and other satellite-based positioning systems, has progressed to sub-centimeter accuracy with known correction techniques, including a number of commercial satellite based augmentation systems (SBASs).

For even more accurate information, higher frequency signals with shorter wavelengths are required. It is known in the art that by using GNSS satellites' carrier phase transmissions, and possibly carrier phase signal components from base reference stations or satellite based augmentation systems (SBAS), including the Wide Area Augmentation System (WAAS) (U.S.), and similar systems such as EGNOS (European Union) and MSAS (Japan), a position may readily be determined to within millimeters. When accomplished with two antennas at a fixed spacing, an angular rotation may be computed using the position differences. In an exemplary embodiment, two antennas placed in the horizontal plane may be employed to compute a heading (rotation about a vertical axis) from a position displacement. Heading information, combined with position, either differentially corrected (DGPS) or carrier phase corrected real-time kinematic (RTK), provides the feedback information desired for a proper control of the vehicle direction.

Another benefit achieved by incorporating a GNSS-based heading sensor is the elimination or reduction of drift and biases resultant from a gyro-only or other inertial sensor approach. Yet another advantage is that heading may be computed while movable equipment is stopped or moving slowly, which is not possible in a single-antenna, GNSS-based approach that requires a velocity vector to derive a heading. Yet another advantage of incorporating a GNSS-based heading sensor is independence from a host vehicle's sensors or additional external sensors. Thus, such a system is readily maintained as equipment-independent and may be moved from one vehicle to another with minimal effort. Yet another exemplary embodiment of the sensor employs global navigation satellite system (GNSS) sensors and measurements to provide accurate, reliable positioning information. GNSS sensors include, but are not limited to, GPS, Global Navigation System (GLONAS), Wide Area Augmentation System (WAAS) and the like, as well as combinations including at least one of the foregoing.

An example of a GNSS is the Global Positioning System (GPS) established by the United States government, which employs a constellation of 24 or more satellites in well-defined orbits at an altitude of approximately 26,500 km. These satellites continually transmit microwave L-band radio signals in two frequency bands, centered at 1575.42 MHz and 1227.6 MHz, denoted as L1 and L2 respectively. These signals include timing patterns relative to the satellite's onboard precision clock (which is kept synchronized by a ground station) as well as a navigation message giving the precise orbital positions of the satellites, an ionosphere model and other useful information. GPS receivers process the radio signals, computing ranges to the GPS satellites, and by triangulating these ranges, the GPS receiver determines its position and its internal clock error.

In standalone GPS systems that determine a receiver's antenna position coordinates without reference to a nearby reference receiver, the process of position determination is subject to errors from a number of sources. These include errors in the GPS satellite's clock reference, the location of the orbiting satellite, ionosphere induced propagation delay errors, and troposphere refraction errors. The overall positional signal is weakened with each satellite target lost. These targets may be lost due to obstructions such as trees, hills, or merely because the satellite has orbited out of view.

To overcome these positioning errors of standalone GPS systems, many positioning applications have made use of data from multiple GPS receivers. Typically, in such applications, a reference or base receiver, located at a reference site having known coordinates, receives the GPS satellite signals simultaneously with the receipt of signals by a remote or rover receiver. Depending on the separation distance between the two GPS receivers, many of the errors mentioned above will affect the satellite signals equally for the two receivers. By taking the difference between signals received both at the reference site and the remote location, these errors are effectively eliminated. This facilitates an accurate determination of the remote receiver's coordinates relative to the reference receiver's coordinates. Additional sensors may also be used to support weak GNSS positional data, such as an inertial measurement unit which may include a gyroscope. Such additional sensors are, however, prone to lose calibration and then need to be corrected.

Differential global navigation satellite system (DGNSS) guidance utilizes a localized base receiver of known location in combination with a rover receiver on a moving vehicle for obtaining accurate vehicle positions from GNSS data. Differential positioning, using base and rover receivers, provides more accurate positioning information than standalone systems because the satellite ranging signal transmission errors tend to effect the base and rover receivers equally and therefore can be cancelled out in computing position solutions. In other words, the base-rover position signal "differential" accurately places the rover receiver "relative" to the base receiver. Because the "absolute" geo-reference location of the fixed-position base receiver is precisely known, the absolute position of the rover receiver can be computed using the base receiver known, absolute position and the position of the rover receiver relative thereto.

Differential GPS is well known and exhibits many forms. GPS applications have been improved and enhanced by employing a broader array of satellites such as GNSS and WAAS. For example, see commonly assigned U.S. Pat. No. 6,469,663 to Whitehead et al. titled Method and System for GPS and WAAS Carrier Phase Measurements for Relative Positioning, dated Oct. 22, 2002, the disclosures of which are incorporated by reference herein in their entirely. Additionally, multiple receiver DGPS has been enhanced by utilizing a single receiver to perform differential corrections. For example, see commonly assigned U.S. Pat. No. 6,397,147 to Whitehead titled Relative GPS Positioning Using A Single GPS Receiver With Internally Generated Differential Correction Terms, dated May 28, 2002 the disclosures of which are incorporated by reference herein in their entireties.

It is not uncommon to utilize a GNSS system in combination with an automatic-steering module linked to a vehicle's steering manifold through a steering controller unit. The guidance unit receives positional information from the GNSS unit and compares it with a pre-planned path or map. Because the GNSS positional information allows the guidance unit to know exactly where the vehicle is located along a path, it can use this information to automatically guide and steer the vehicle along this path.

A steering controller is required to accept instructions from the guidance unit and actually perform the steering controls on the vehicle. This device connects to the vehicle steering manifold and/or hydraulic steering valves. Signals from the guidance unit are delivered to the steering controller, which then commands hydraulic valves to open or close depending on the desired results.

Automatic steering systems using GNSS data tend to lose accuracy. If the system calibration is off the steering controller may tend to over-correct, resulting in erratic turns. Additionally, loss of the GNSS signal could affect the automatic steering function.

SUMMARY OF THE INVENTION

Disclosed herein is a method for providing accurate and precise vehicle positioning guidance and control with automatic steering capabilities. The present invention utilizes a series of separate sensors which may serve as temporary reliable guidance devices when GNSS signals are weak, and are recalibrated when GNSS signals are strong. This reliable positioning information gathering allows multiple vehicles to operate in cooperation with each other using autonomous task delegation and control. A versatile system is described that facilitates a number of precise steering tasks for a variety of functions using proportional hydraulic control and state-of-the-art GNSS positional systems.

BRIEF DESCRIPTION OF THE DRAWINGS

In the accompanying drawings, which illustrate the principles of the present invention and an exemplary embodiment thereof.

DETAILED DESCRIPTION OF THE PREFERRED ASPECTS

I. Introduction, Environment, and Preferred Embodiment

Generally, a preferred embodiment of the present invention consists of components which allow a farming vehicle, with or without an attached farming implement, to automatically guide itself around a field and perform a plurality of functions, leading to precision farming. Said vehicle may be in constant communication with other vehicles similarly equipped for the same or different tasks. The vehicles within such a network are capable of making decisions amongst themselves about where to go and what to do to best perform assigned tasks based on the global position of each vehicle relative to each other and the location of said tasks.

Figure 1:
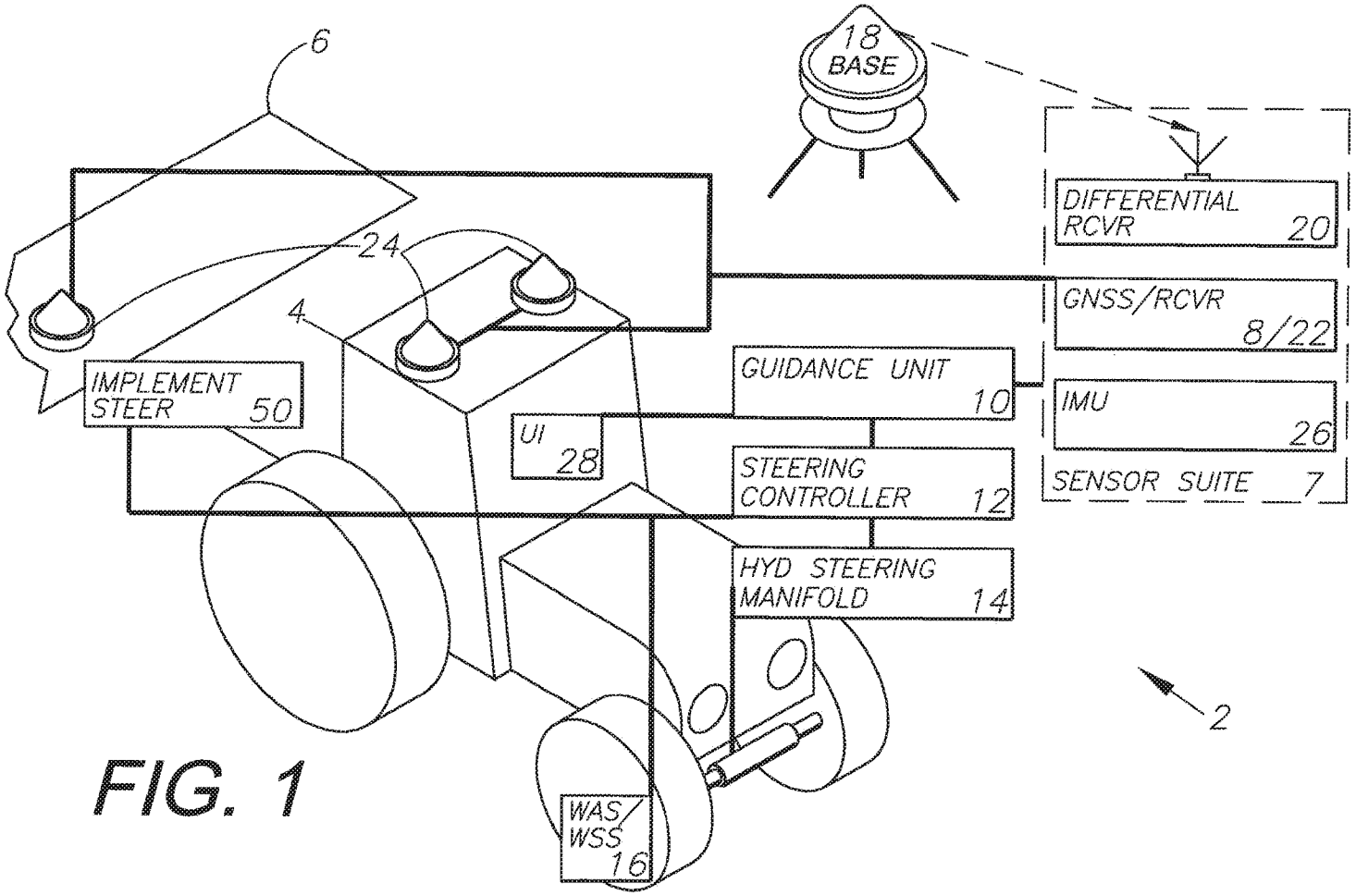
FIG. 1 is an isometric view of a tractor demonstrating the preferred embodiment.
Figure 1A:
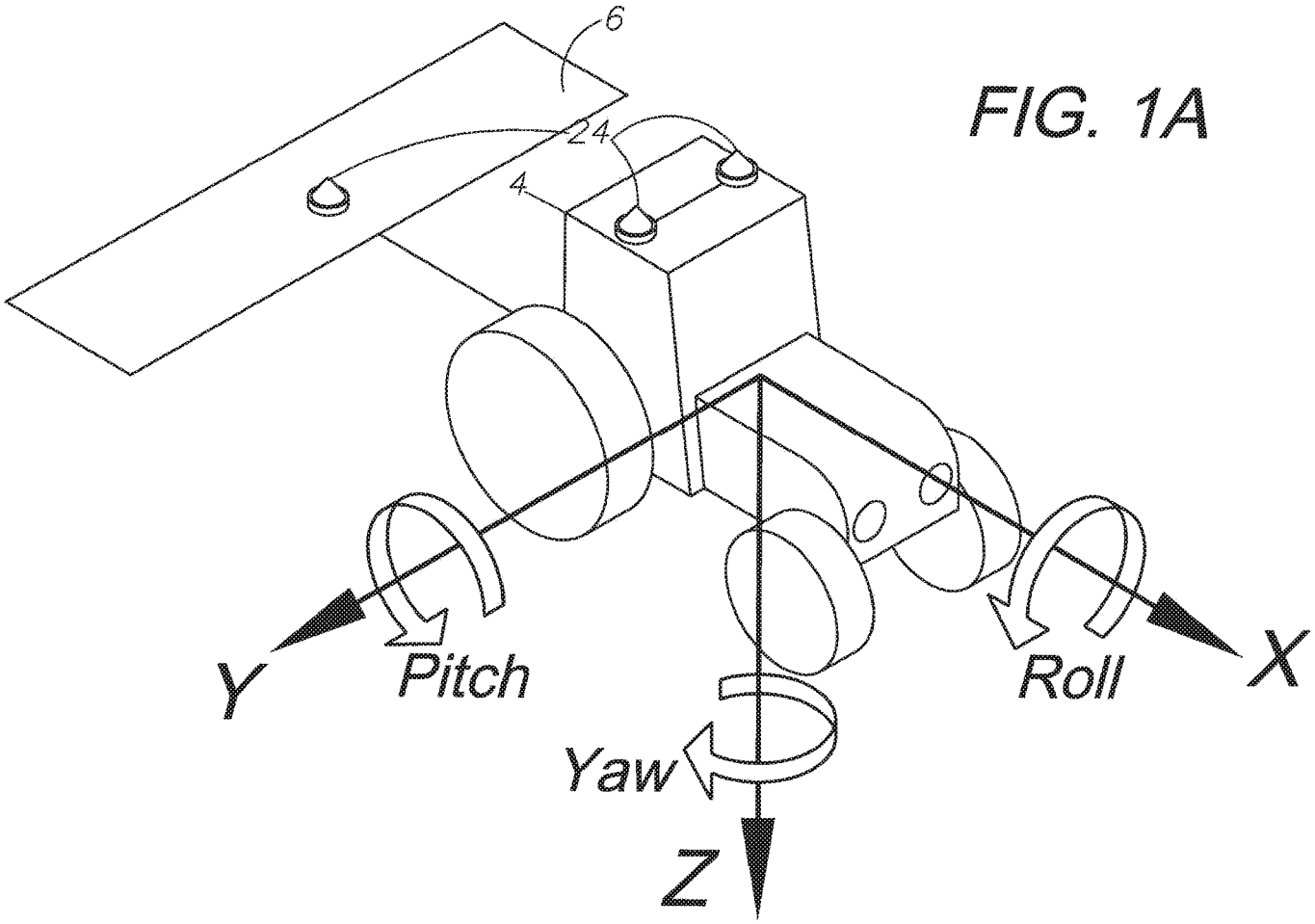
FIG. 1A is an isometric view of a tractor demonstrating the three axes of orientation (X, Y and Z) and three possible directions of rotation (pitch, roll, and yaw).
Figure 2:
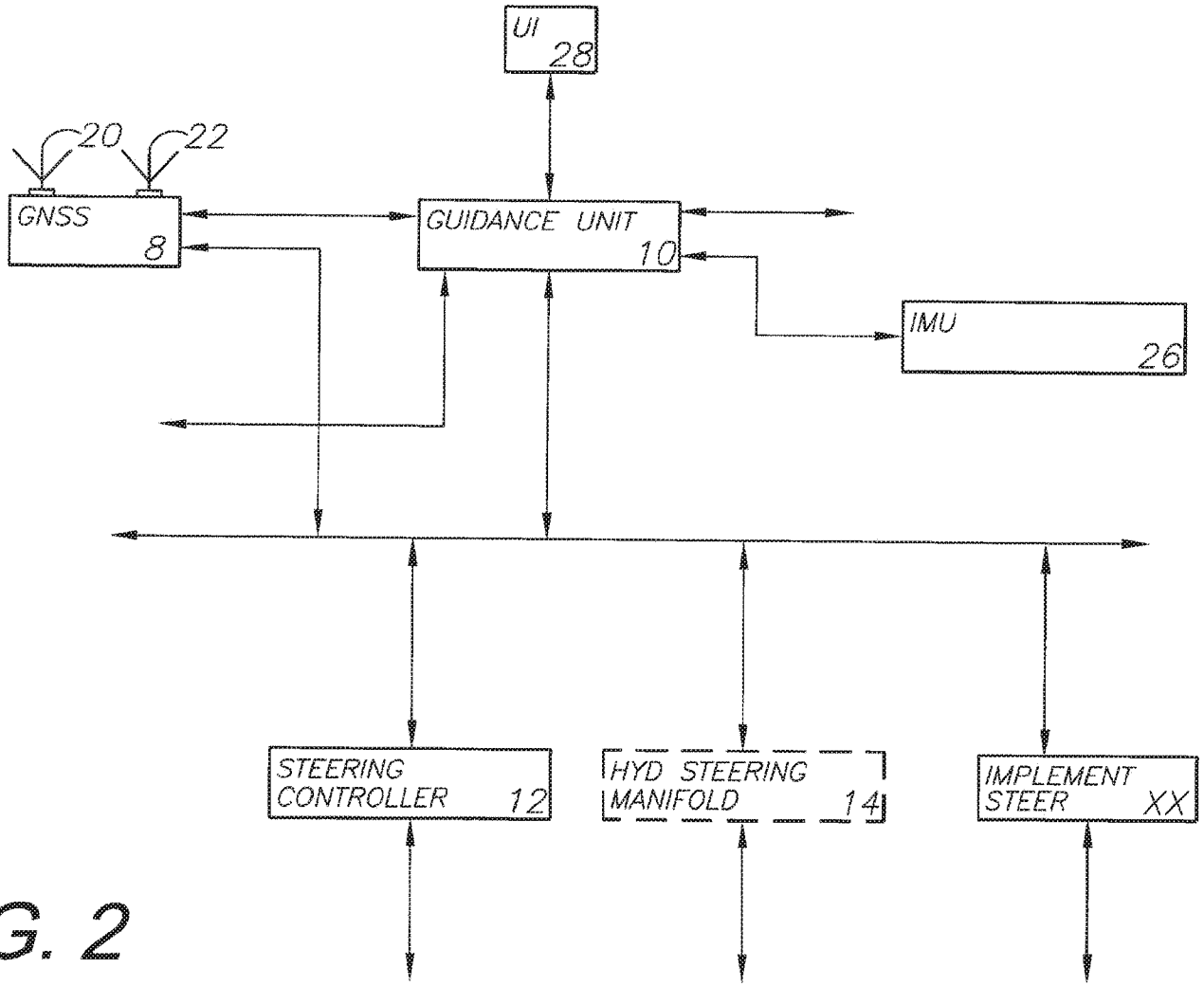
FIG. 2 is an alternative line diagram demonstrating the relationship between devices in an embodiment of the invention.

The preferred embodiment or the integrated multi-sensor guidance system (guidance system) 2, as shown in FIG. 1, includes a vehicle 4, which may be equipped with a farming implement 6, a sensor suite 7, a guidance unit 10 capable of versatile path guidance, a steering controller 12 providing proportional hydraulic control, a hydraulic steering manifold 14, a wheel angle/speed sensor (WAS) 16, and an implement steering manifold 50. Additionally, the guidance system 2 includes a base station antenna 18 to communicate with a differential receiver 20, a GNSS receiver 22 connected to a plurality of antennas 24 located on the vehicle 4, and an inertial measurement unit (IMU) 26 for providing additional information to said guidance unit 10. Also included is a user interface 28 within the cab of the vehicle 4 allowing the driver of that vehicle to manually input commands into the guidance system 2 and override automatic control.

The preferred embodiment of the present invention has at least four particular applications. First, there is a command center approach that can be applied, where the guidance system is a one-time capital investment that can be moved and used with each piece of farming equipment, regardless of the season or the task being performed. Second, a highly accurate yet economical automatic steering application is available. Such an application can allow for high accuracy work to be performed 24 hours a day, 7 days a week with limited stress on human drivers. The third particular application of the present invention deals with sectional control of implements; that is the guidance unit can selectively shut off portions of the working implement where overlap would otherwise occur. Finally, site-specific farming using variable rate control can be applied. Depending on the site and the crop being grown, the system can fluctuate how much work the implement does, whether that be spraying, seeding, or tilling.

FIGS. 11A-G demonstrate the versatility of the automatic steering capabilities of the present invention on straight, contour, and circle pivot driving paths. These figures demonstrate a vehicle being self-driven around a series of different path-types 64 which are automatically generated by the guidance system 10 of the preferred embodiment due to information both manually input and gathered by the sensor suite 7. These figures demonstrate how the guidance system 2 will recognize field borders 62 and obstacles 66. When the planned path 64 encounters the obstacles 66, the system will either automatically create an alternative path 72 or return manual control to the vehicle driver. When the planned path 64 encounters the field border 62, the system will automatically shut off all implement controls and either perform an automatic turn in the headlands 68 or return manual vehicle control to the vehicle operator.

II. Sensor Suite

The sensor suite 7 is comprised of a plurality of sensors, including at least a GNSS system 8, a wheel angle sensor (WAS) 16 and an inertial measurement unit (IMU) 26. Additional sensors may include a video camera unit oriented in the vehicle towards the direction of travel. For example, the video camera unit can be oriented towards a landmark on the horizon, which can provide an aiming point or point of reference corresponding to a predetermined geo-reference location. Other sensors in the sensor suite 7 can include a radar unit for ranging and direction finding, e.g., to a particular radar target. A laser unit, radio input, telemetry, and other sensor units capable of aiding in precision position and trajectory mapping can also be utilized. This suite of sensors gathers position and heading data and relay this information to the guidance unit 10 discussed in detail in section III.

In the preferred embodiment of this invention, the GNSS system 8 will be assigned the highest confidence level as a default, and is thus a primary and important element to this guidance system 2. Global navigation satellite systems (GNSS) are broadly defined to include GPS (U.S.), Galileo (proposed), GLONASS (Russia), Beidou/Compass (China, proposed), IRNSS (India, proposed), QZSS (Japan, proposed) and other current and future positioning technology using signals from satellites, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along transverse X, longitudinal Y and vertical Z axes). Yaw, pitch and roll refer to moving component rotation about the Z, X and Y axes respectively. Said terminology will include the words specifically mentioned, derivatives thereof and words of similar meaning.

Disclosed herein in an exemplary embodiment is a sensor system for vehicle guidance. The sensor system can utilize a plurality of GNSS code or carrier phase differenced antennas to derive attitude information, herein referred to as a GNSS attitude system. Moreover, the GNSS attitude system may optionally be combined with one or more rate gyro(s) used to measure turn, roll or pitch rates and to further calibrate bias and scale factor errors within these gyros. In an exemplary embodiment, the rate gyros and GNSS receiver/antenna are integrated together within the same unit, to provide multiple mechanisms to characterize a vehicle's motion and position to make a robust vehicle steering control mechanism.

The preferred embodiment of the present invention includes a vehicle 4, an implement 6, and a sensor suite 7. The sensor suite is comprised of a plurality of sensors, containing at least a GNSS system 8, a WAS 16, and an IMU 26. Said GNSS system 8 is further comprised of a receiver 22, a differential receiver 20, a base station antenna 18, and a plurality of antennas 24 located on said vehicle 4 and implement 6. The GNSS system provides position information to the guidance unit 10. This information can be used or creating a path 64 around a field 60, establishing alternatives 72 to said path when obstacles 66 are encountered.

The sensor suite 7 will integrate all connected sensors with the ultimate result being robust tight wheel control; that is, wheel and vehicle control at a very precise level. This sensor integration implements a confidence level or reliance level checklist by which certain sensors are given higher-priority when position information is used unless those sensors are reporting weak or no signal. Higher priority sensor systems are used to recalibrate lower priority systems while said higher priority systems remain at their default signal levels. This ensures that when the higher priority systems lose signal, the lower priority systems are timely calibrated to compensate for the higher priority system for the short time period of reduced signal.

III. Guidance Unit 10

A guidance unit 10, otherwise known as an electronic control unit (ECU), can be put to several different uses on an agricultural vehicle. One common use is to provide heading data based on a pre-planned or calculated path 64. The guidance unit might have the path manually input into the unit, or it might be capable of receiving GNSS positional data and information regarding a particular piece of land and calculate a path based off of this information. The guidance unit 10 can display information to the vehicle's driver through a user interface (UI) 28 and allow the driver to manually steer the vehicle along the displayed path. A more precise application of such a guidance unit 10 is to introduce automatic steering to a farming vehicle 4. The vehicle 4 will then guide itself along said calculated or pre-planned path 64 with greater precision than manual steering could provide.

The guidance unit 10 can be put to additional uses as well, including automated implement control and advanced mapping and data management. The automated implement control comprises sectional implement control, including application rate control and variable rate control. The advanced mapping and data management, as mentioned above, includes the system's ability to take known landscape information from the GNSS system and store that information for processing during jobs. This leads to real-time map creation as the vehicle self-guides the piece of land to be worked.

The preferred embodiment of the present invention includes the sensor suite 7 mentioned above which is connected to the guidance unit 10. The guidance unit 10 interprets positional data received from the sensor suite 7 and puts it to use in several ways. The guidance unit 10 is further divided into at least a logic portion 30 and a guidance portion 32. The guidance unit receives data from the sensor suite 7, determines what to do with the data in the logic portion 30, including computing a path 64 or selectively controlling the implement, and then transmits that data through the guidance portion 32 to the steering controller 12 and the implement steering controller 50.

Figure 10:
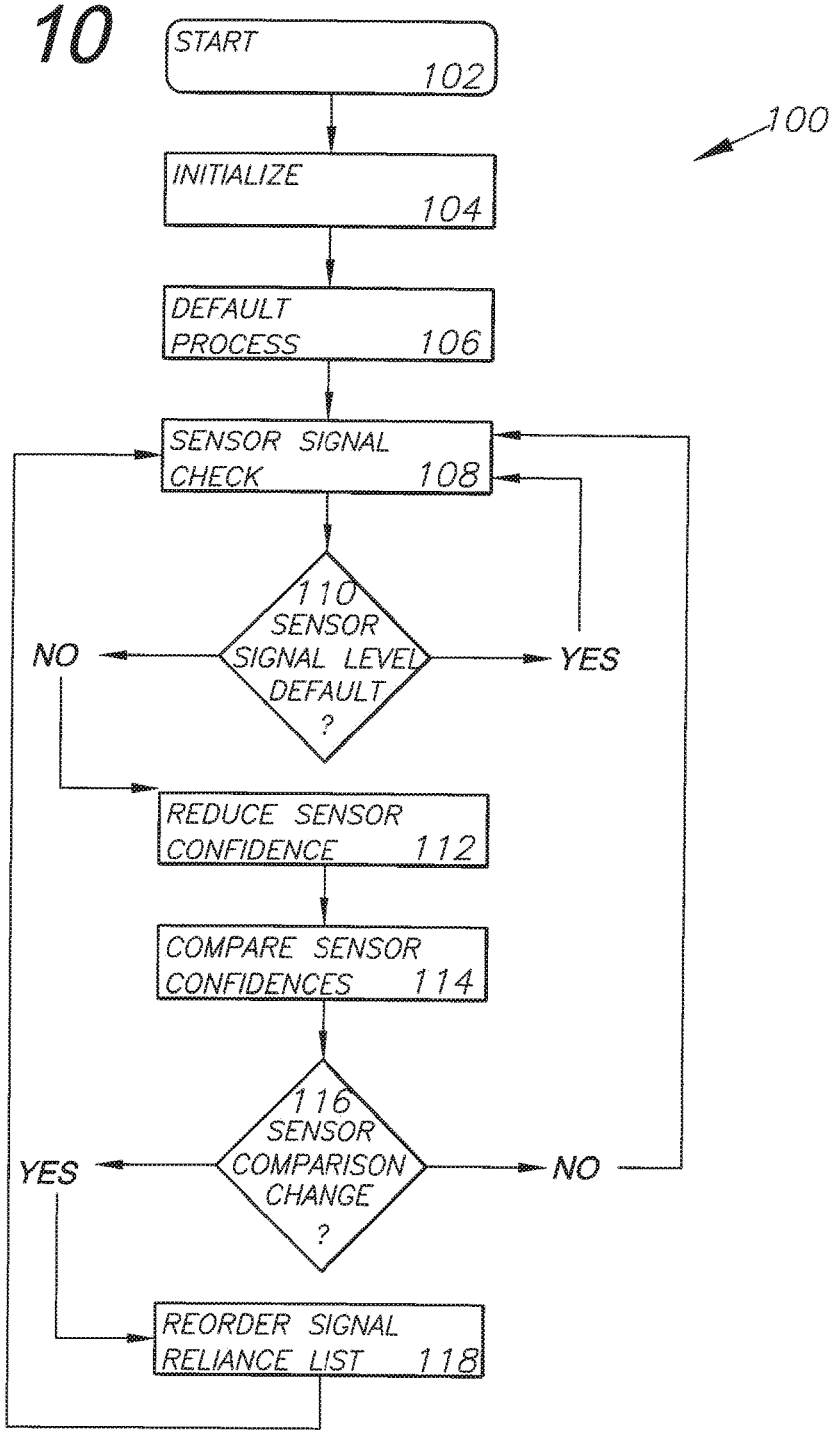
FIG. 10 is a line diagram demonstrating the step-by-step method by which the sensor suite determines confidence levels of various sensors.
Figure 11A:
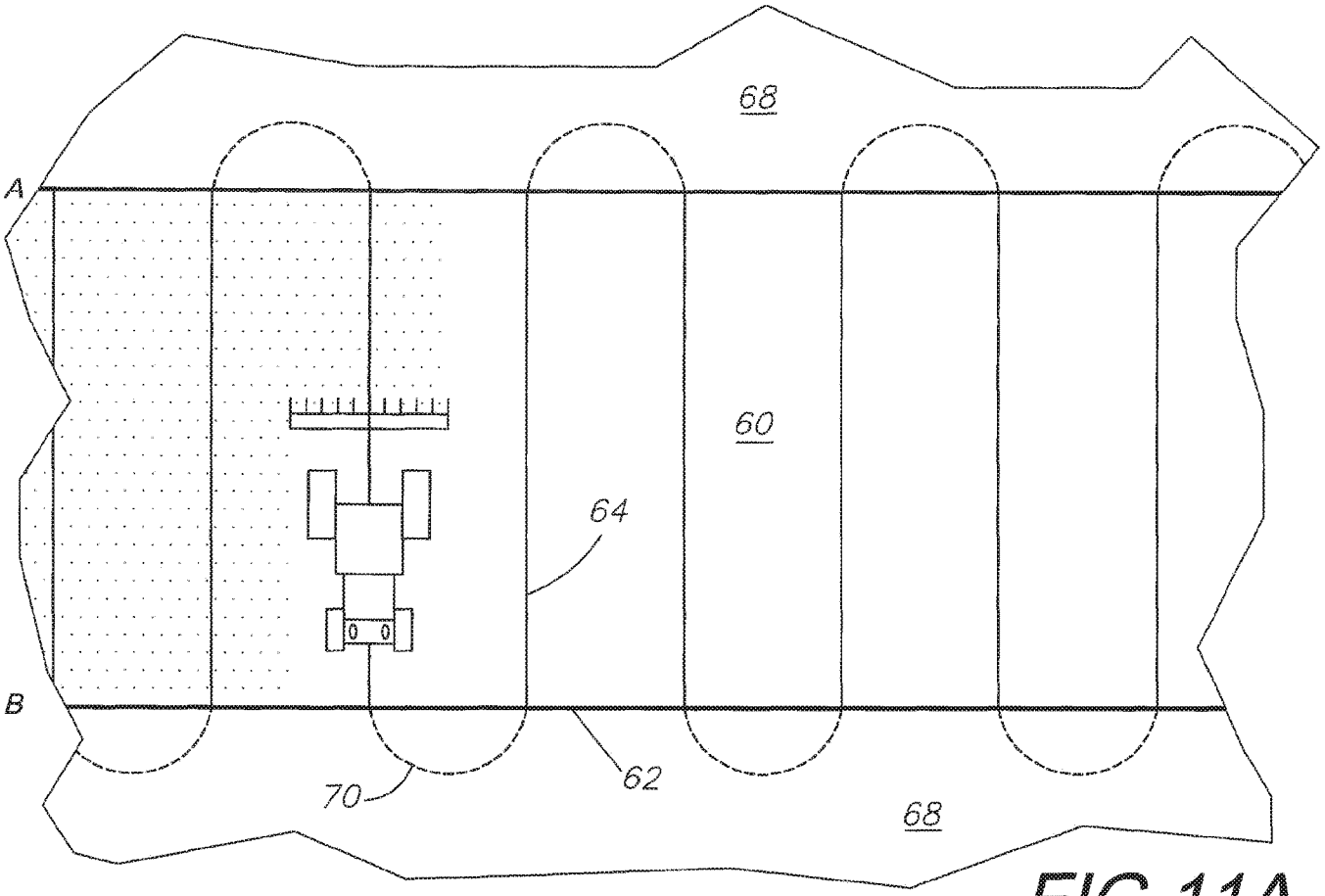
FIGS. 11A-G demonstrate various path-finding, path-creating, and object avoidance possibilities available when a tractor is equipped with the present invention.
Figure 11B:
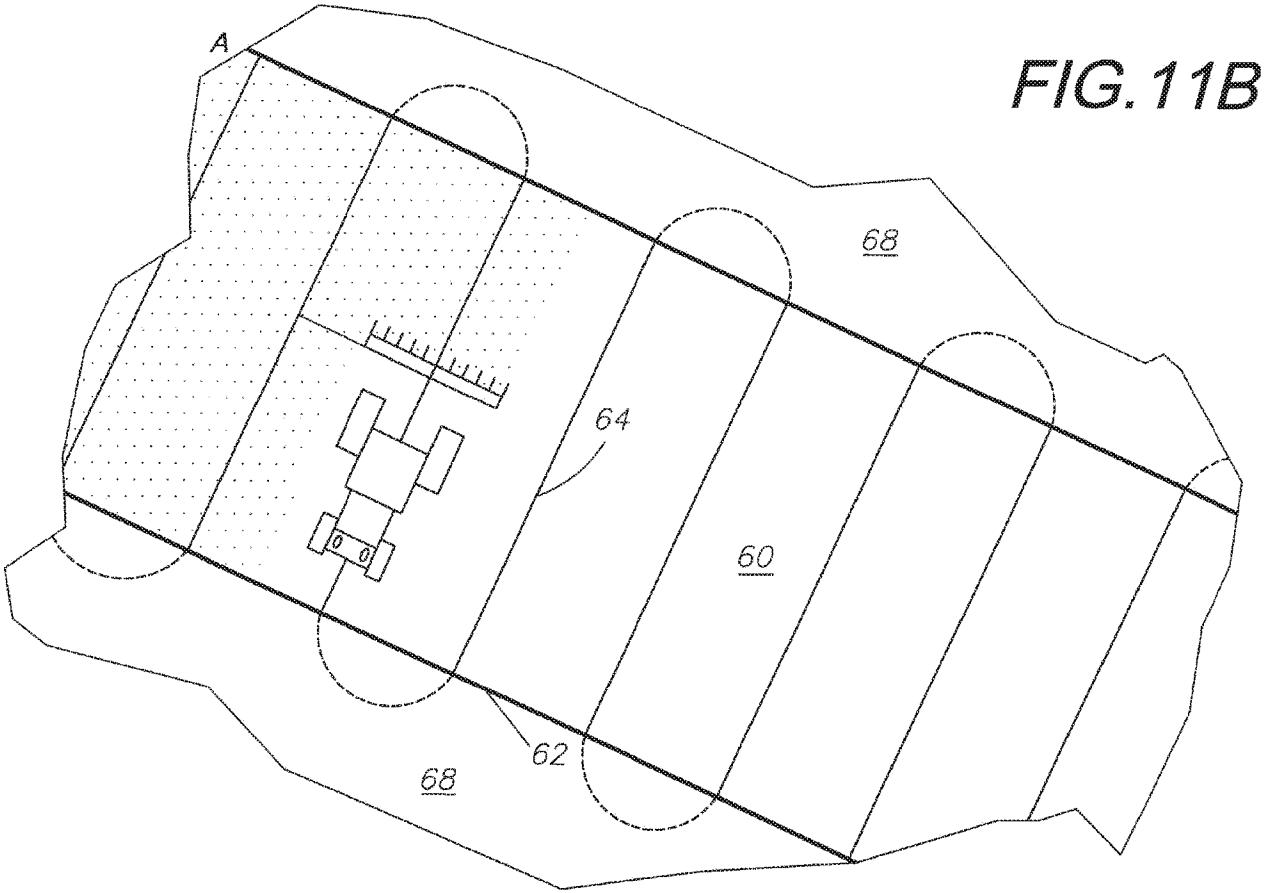
Figure 11C:
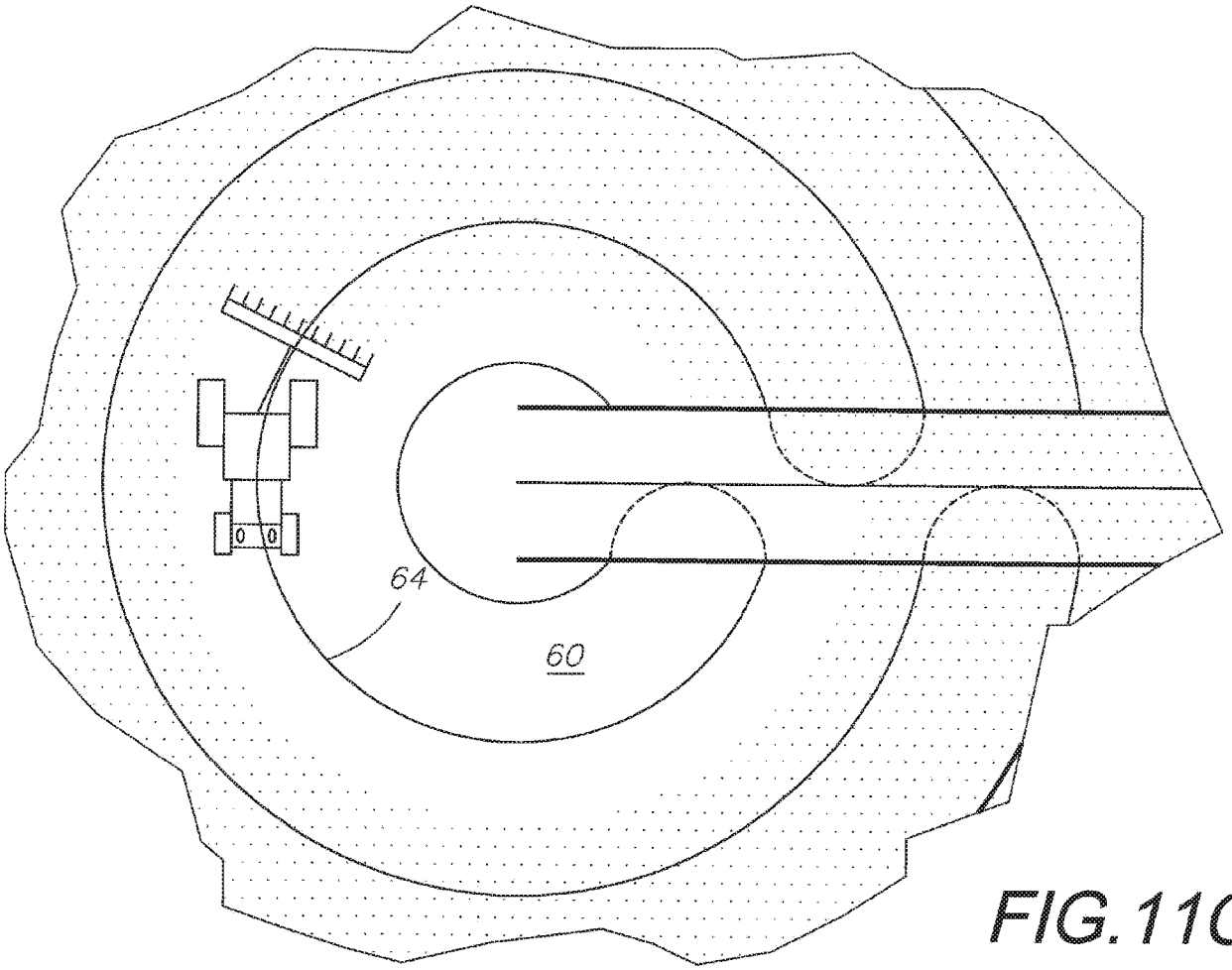
Figure 11D:
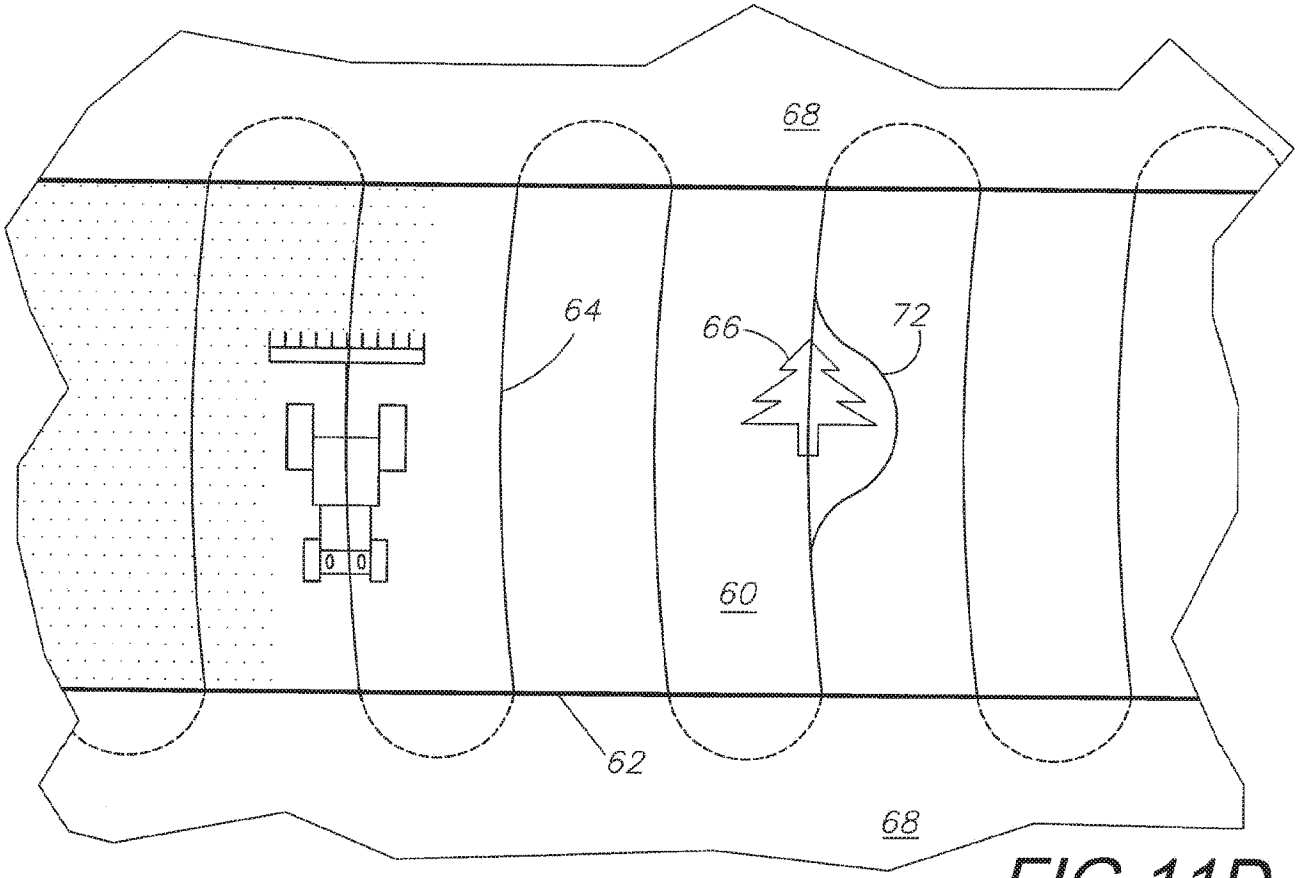
Figure 11E:
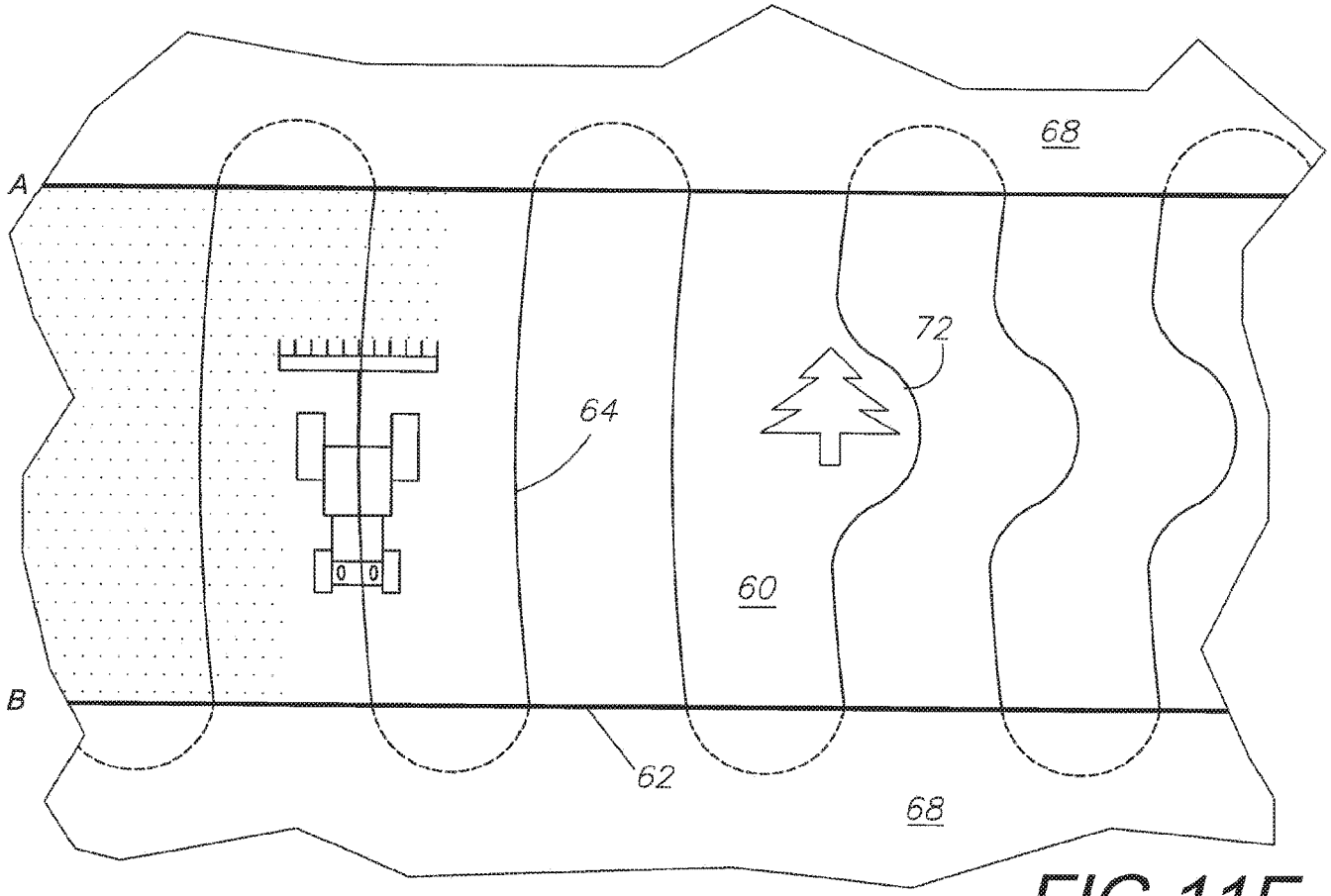
Figure 11F:
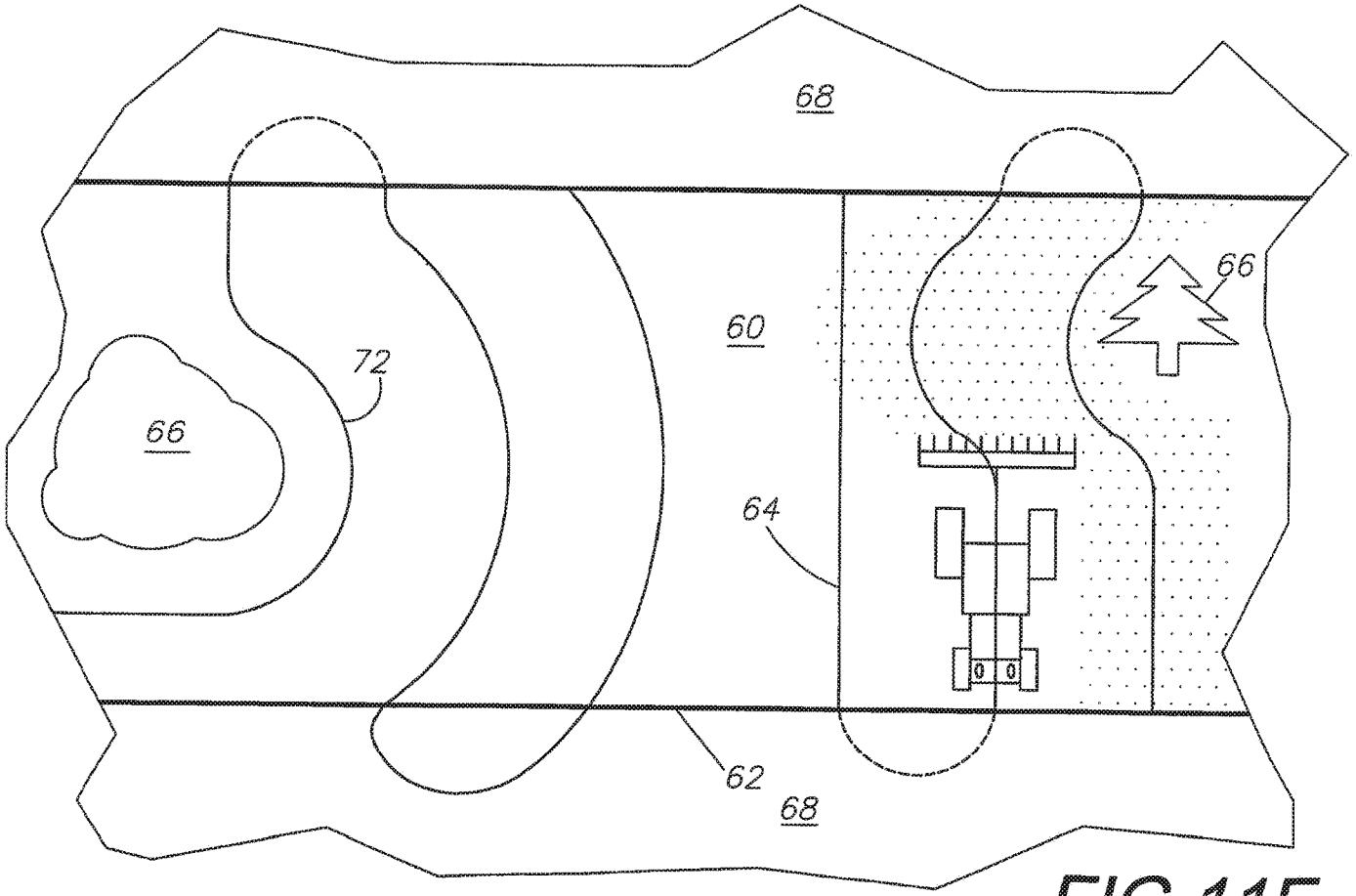
Figure 11G:
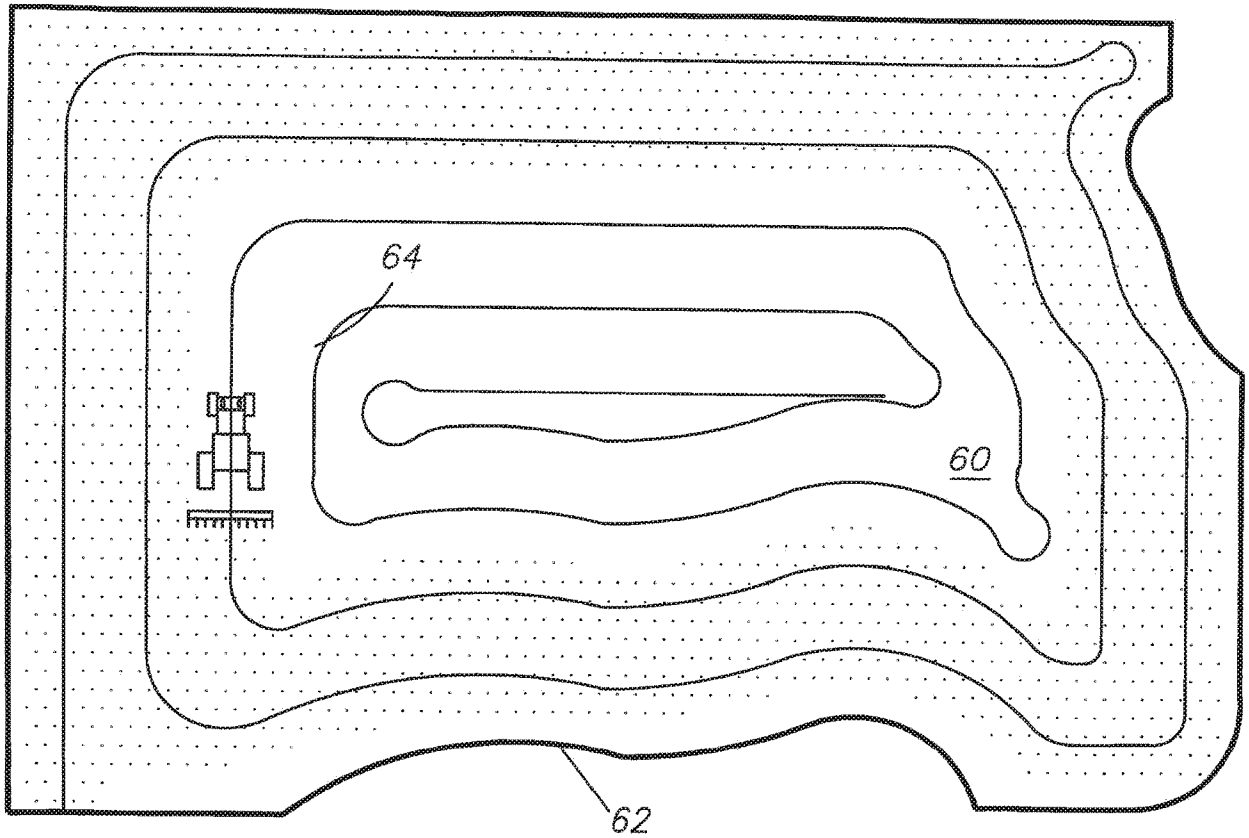

As demonstrated in FIG. 10, a confidence loop 100 is employed by the guidance unit 10 against multiple sensors in the sensor suite 7 to determine which sensor systems should be relied on when determining position and heading information. The confidence loop 100 is comprised of several steps. The start step 102 is initiated when the guidance system 2 is booted up. This can either be directly connected to the start-up of the vehicle 4 to which the system is attached, or completely independent of that vehicle. The system is then initialized at 104 and a default process 106 is begun. In this default process, the sensor systems are placed in a default reliance list whereby a particular sensor is given a higher confidence than other sensors and that high-confidence sensor is used to calibrate all other sensors. This highest confidence sensor is also used for initial position and heading information gathering and to instruct the guidance unit 10. In a preferred embodiment of the invention, the GNSS system 8 could delimit as the initial highest confidence system, followed by the IMU 26 and the WAS 16.

Once the default process 106 is begun, the loop 100 begins a sensor signal check 108. During this step, each sensor's signal is checked internally to determine whether it is communicating properly with the rest of the guidance system 2 and whether incoming signals are present. For example, the GNSS system 8 will be checked several times per second to determine the strength of the satellite signal being received by the antennas 24 and receiver 22. These sensor signal levels are then compared 110 with the default signal levels that are expected. If these detected signals are equal to or exceed the strength of the expected signal, a "yes" command is entered and the sensor signal check begins again.

If, however, the detected signal is lower than the expected default signal, a "no" command is reported and the loop 100 enters a confidence level reduction step 112 whereby the particular sensor's confidence level is reduced according to the strength of the detected signal. A confidence level comparison step 114 is then performed, comparing the updated confidence levels of all sensors in the sensor suite 7. If the result of the sensor-reliance reordering step 116 is a change in reliance levels, a "yes" command is returned and the reliance priority list is reordered at 118. This occurs when the confidence level of a particular sensor drops so low due to a weak or loss of signal that its information is no longer reliable. That sensor drops down in the reliance list and the new most reliable sensor is used to produce position and heading information until a sensor signal check 108 results in the original sensor regaining its signal and thus priority level. If the result of the sensor-reliance reordering step 116 is "no," then the reliance list is not reordered and the confidence loop 100 returns to the sensor signal checking step 104.

This process of steps ensures that only the most reliable sensors are used to determine current vehicle position and heading and to recalibrate less reliable sensors. The listed steps are an example of such a confidence loop 100 and are not intended to be the only means to achieve the desired results. Additional or fewer steps may be used to return an appropriate confidence or reliance level list.

As an example of this process, the guidance unit 10 is connected to the steering controller 12 and the WAS 16. The guidance unit can relay correction information from the GNSS positioning system 8 to the WAS for calibration purposes. The WAS 16 is initially calibrated with a zero-heading and receives information from the steering controller 12 regarding turn data, and in turn relays actual data back to the steering controller and the guidance unit. The guidance unit knows exact position and heading information because of data received from the GNSS system 8 and other sensors high on the reliability list. By comparing the highly reliable GNSS information with the less reliable WAS information, the guidance unit can tell whether the WAS is correct or not. If it is determined that the WAS information is incorrect, the guidance unit can recalibrate the WAS and create a new zero-heading. In the alternative, if the confidence loop 100 were to determine that the GNSS system 8 had a weak signal at a particular point, the guidance unit 10 could rely on data from the IMU 26 and/or WAS 16 until the GNSS signal returns. These additional sensors are better suited for short-term accurate guidance, but quickly degrade and must be recalibrated.

IV. Steering Controller 12

The steering controller 12 is the third major component of the guidance system 2. The steering controller is designed to accept guidance inputs and transform those inputs into outputs that result in actual motion and steering of the vehicle 4.

The steering controller 12 portion of the guidance system 2 is designed to transmit and receive steering information from all associated parts and to provide the means for actually controlling the direction of the vehicle 4 based upon position and guidance data gathered by the sensor suite 7 and interpreted by the guidance unit 10. The steering controller is directly connected to the guidance unit 10, the WAS 16, the hydraulic steering manifold 14, and the implement controller 50. The steering controller 12 is the primary step for transforming data from the guidance system into actual movement of the vehicle itself.

Although the WAS 16 is part of the sensor suite 7 as discussed above, there is a direct connection between the WAS 16 and the steering controller 12. This results in a "wheel loop" whereby the steering controller 12 transmits steering commands to the hydraulic steering manifold 14 which proceeds to turn the wheels of the vehicle 4 in a direction. The angle of the turn is reported back to the steering controller, which may order further steering corrections depending on the pre-planned path 64. This angle can also reported to the guidance unit 10 where it is compared with other sensors in the confidence loop 100. Assuming another sensor, such as the GNSS system 8, is currently at the top of the reliance list, the WAS may be recalibrated if it turns out that the applied turning angle was incorrect when applied to the calculated path 64.

V. Automaton Control

The process of controlling several machines as automatons in a smart and accurate system, such as the one presented herein, is accomplished with the combination of the above-described units into a single, autonomous system allowing one system to control the positioning, guidance, and workload of a fleet of agricultural vehicles.

VI. Alternative Examples of a Guidance System 2

The above sections discuss the preferred embodiment of the invention, comprising generally a sensor suite 7, a guidance unit 10 and a steering controller 12. Several alternative methods of forming the guidance system 2 exist. A primary example is using the GNSS system 8 to completely replace the sensor suite 7, and moving the IMU 26 to the guidance unit 10. Other examples of said guidance system 2 follow.

Figure 3:
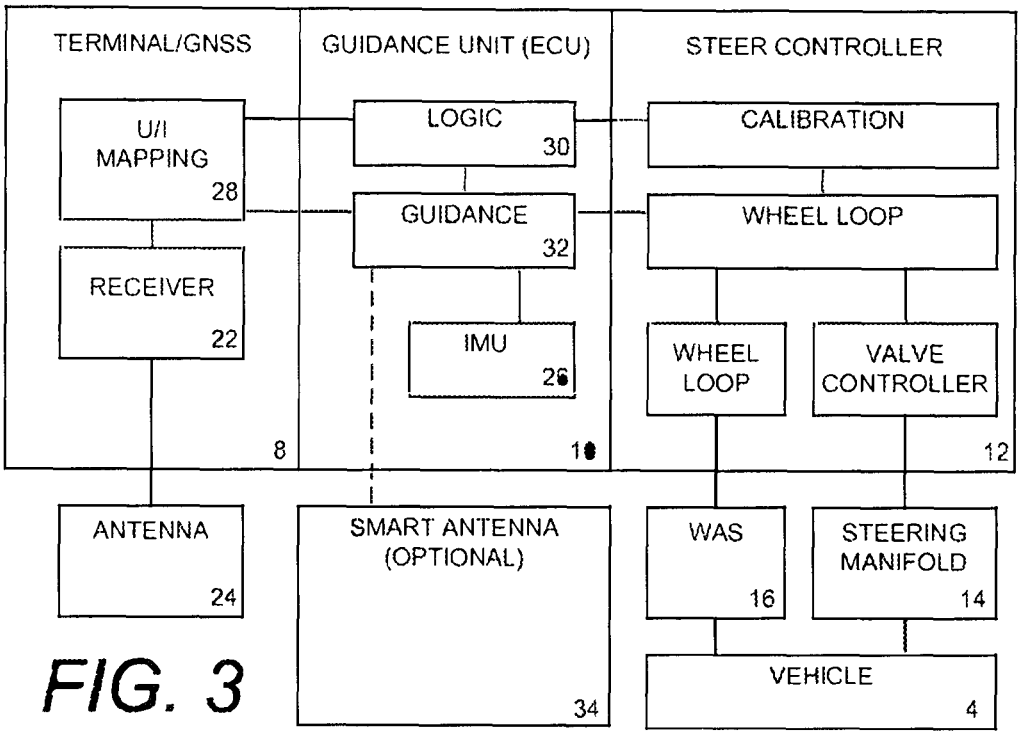
FIG. 3 is an alternative line diagram demonstrating the relationship between devices in an embodiment of the invention.

As shown in FIG. 3, the IMU 26 and an optional "smart" antenna 34 may be directly connected to the guidance unit 10 providing direct information used to compare position and heading information with data received from the sensor suite 7. The smart antenna 34 is a combination receiver 22 and antenna 24. The user interface (UI) 28 is connected directly to the GNSS system 8. Additionally, the WAS 16 is connected separately and entirely to the steering controller 12.

Figure 4:
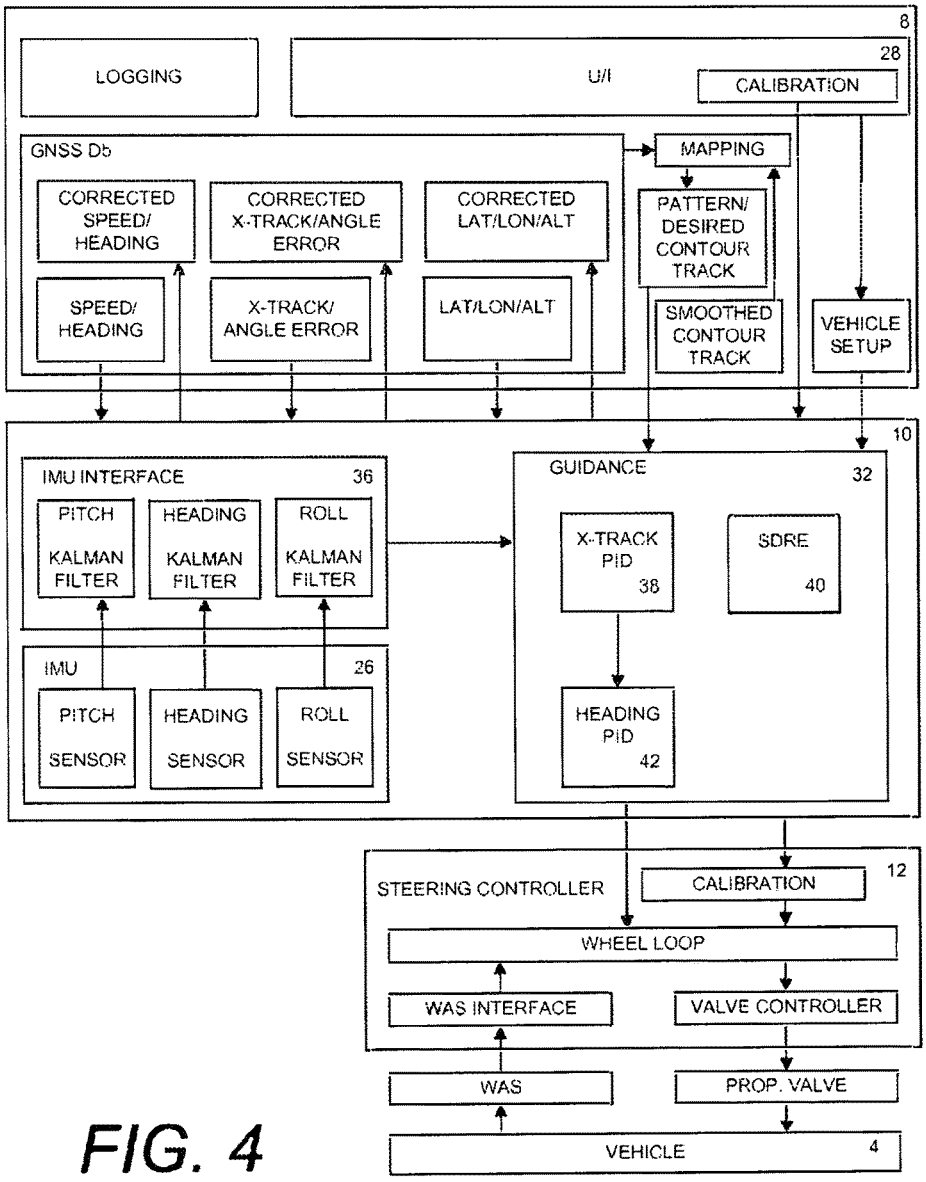
FIG. 4 is an alternative line diagram demonstrating the relationship between devices in an embodiment of the invention.

FIG. 4 provides another detailed breakdown of the guidance unit 10 and its relationship with a GNSS system 8 and the steering controller 12. The IMU 26 is composed of a plurality of Kalman filters 36 which relay information regarding the various degrees of pitch, roll, and heading of the vehicle. The guidance portion 32 is further composed of a cross-track PID 38, a state dependent Ricatti equation (SDRE) 40 and a heading proportional integral derivative (PID) component 42. The steering controller 12 is again in direct communication with the WAS 16.

Figure 5:
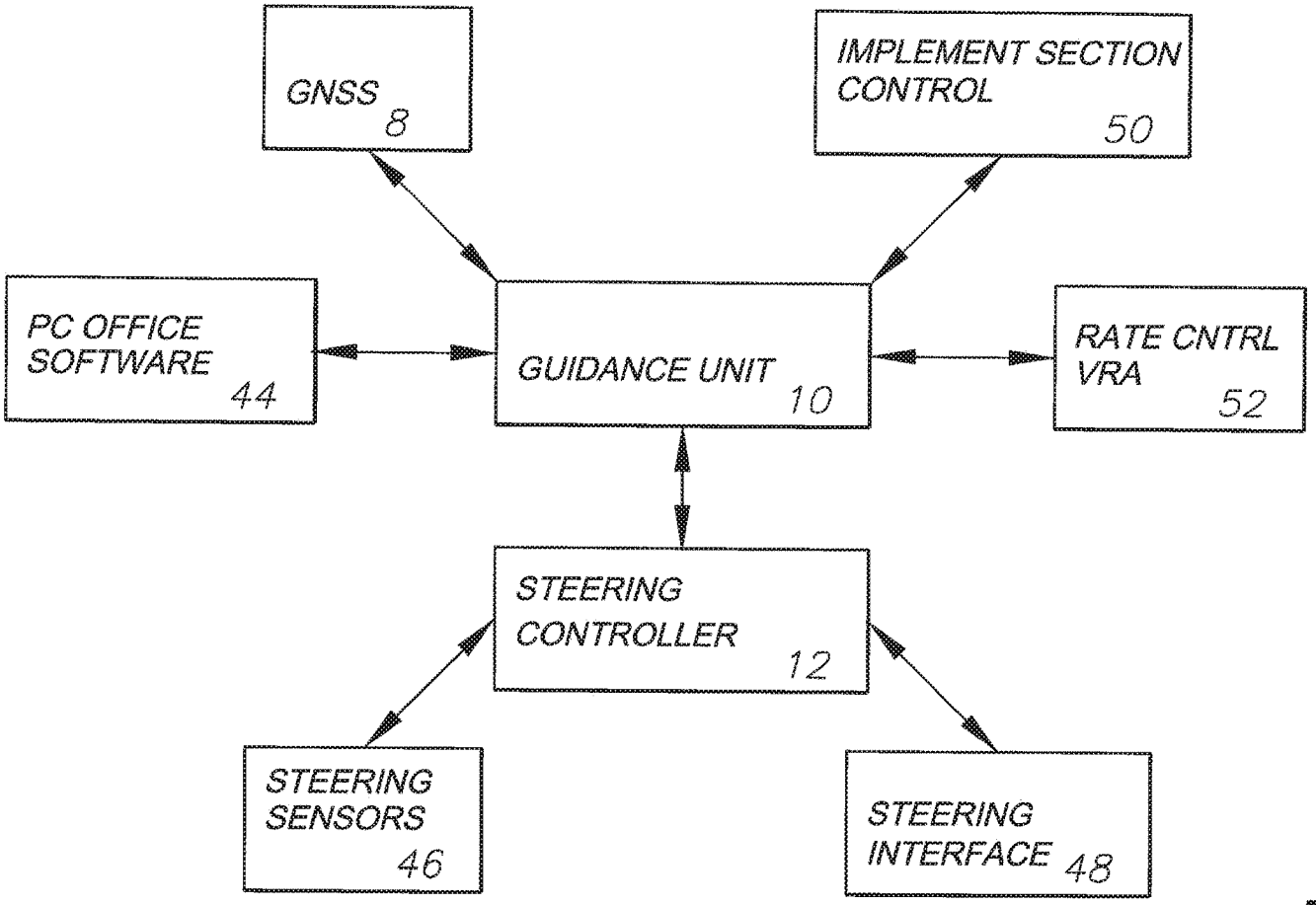
FIG. 5 is an alternative line diagram demonstrating the relationship between devices in an embodiment of the invention.

FIG. 5 demonstrates another alternative example of the relationship between the guidance unit 10 and the other elements of the guidance system 2. In this example the guidance unit 10 is independently connected to several unique elements, including a GNSS system 8, an implement control system 50, a variable rate transfer controller 52, personal computer office software 44, and a steering controller 12. The steering controller is separately connected to steering sensors 46 and the steering interface 48. The steering sensors may in turn contain WAS 16 or other sensor types. An important aspect demonstrated in this figure is the relationship between the guidance unit 10 and cooperative PC office software 44. This relationship is a key element because it allows the guidance unit 10 to be updated, controlled, and calibrated through a connection with a standard office PC. This allows the end-user to create paths, identify field boundaries, and update equipment software while using familiar PC technology instead of new, single-application user interfaces associated solely with the guidance unit.

Figure 6:
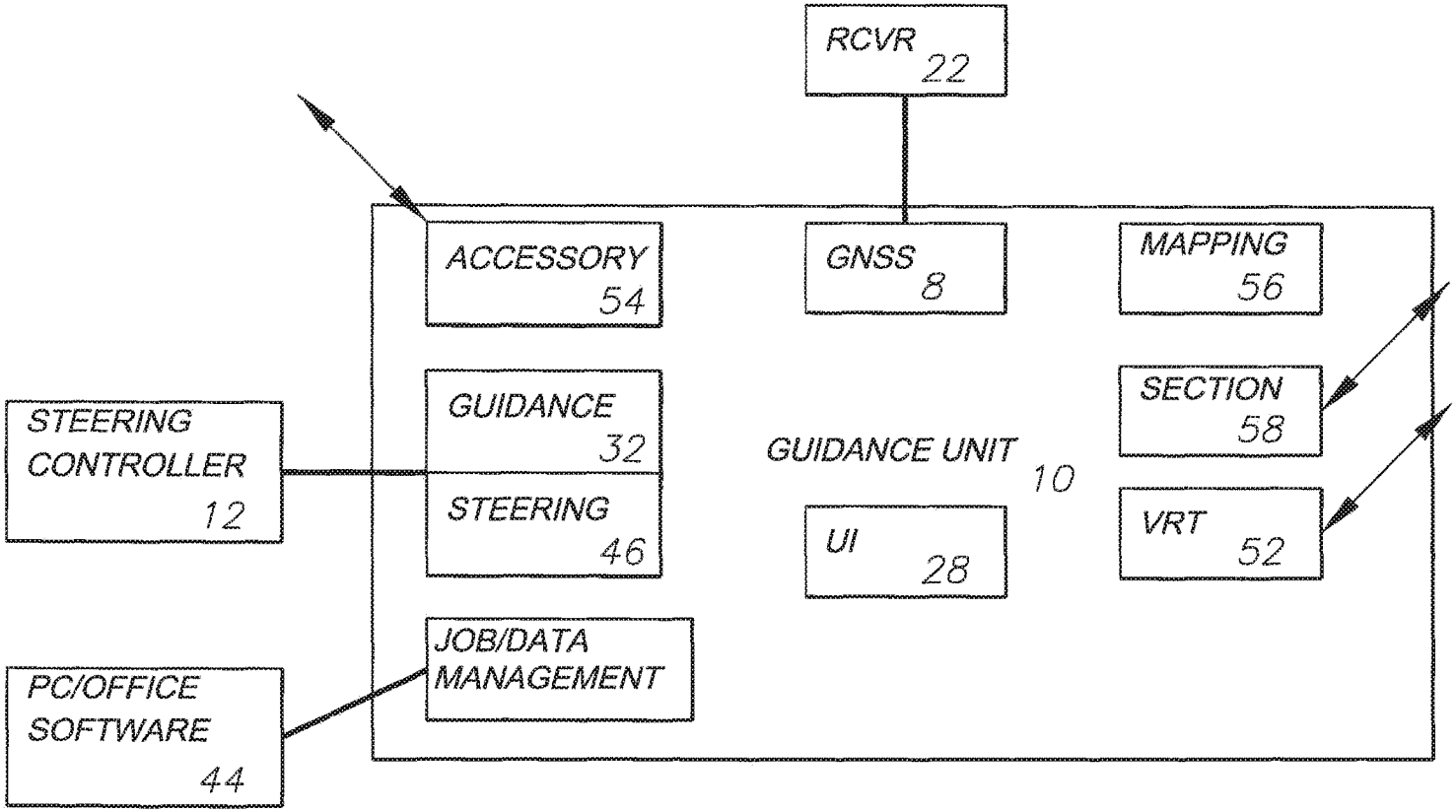
FIG. 6 is an alternative line diagram demonstrating the relationship between devices in an embodiment of the invention.
Figure 7:
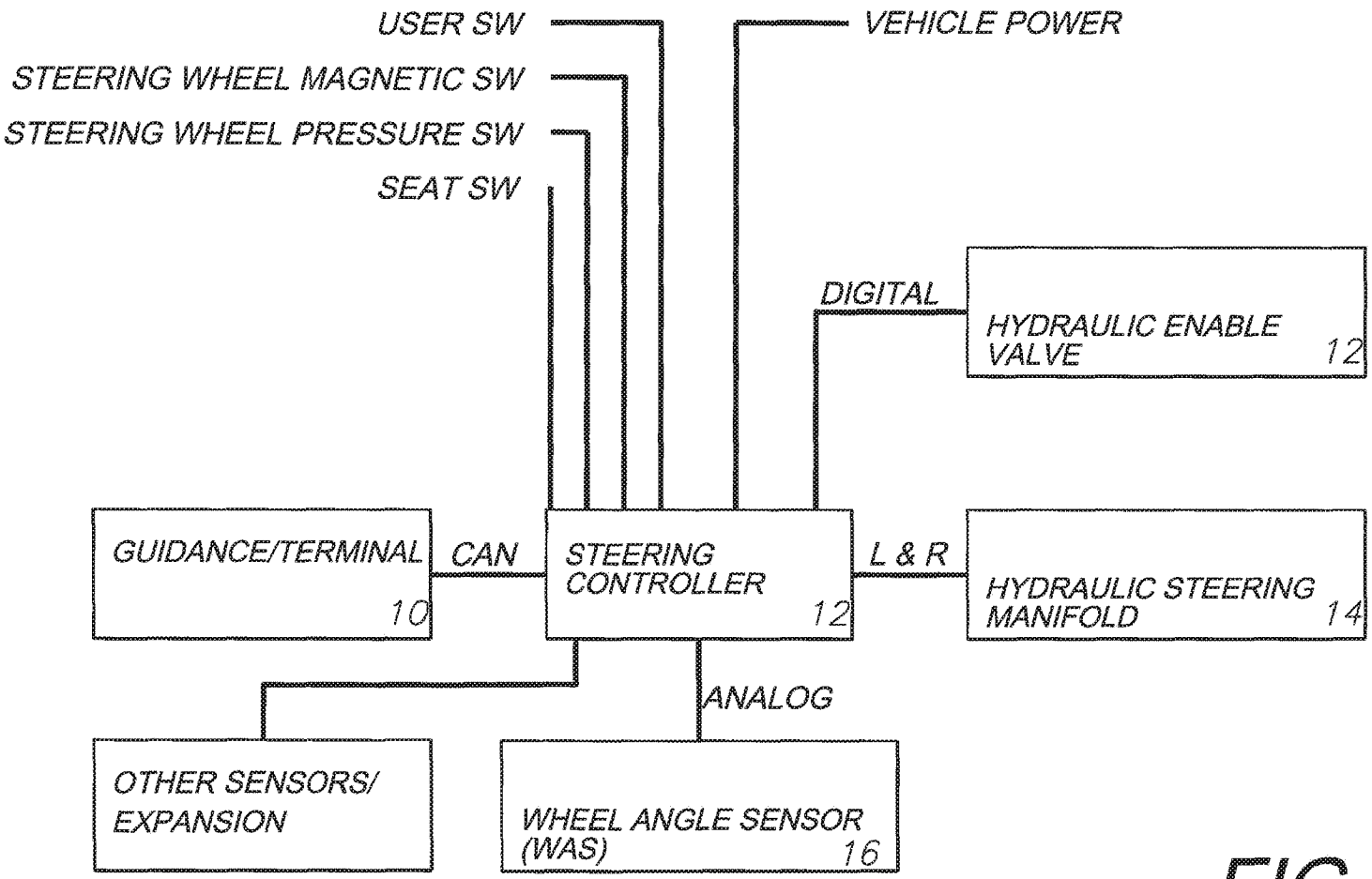
FIG. 7 is an alternative line diagram demonstrating the relationship between devices in an embodiment of the invention.

FIG. 6 demonstrates another alternative example of the present invention. In this example, the guidance unit 10 contains a majority of the standard system elements, including the GNSS system 8, a UI 28, a variable rate controller 52, guidance 32 and steering 46 sensors, an accessory input 54, a mapping device 56, and a section controller 58 containing input/output connections. The accessory input device 54 allows the guidance controller to connect to external devices such as a weather radio, wireless service, video sensors, and monitoring devices. A wireless receiver 22 is connected to the GNSS 8 portion of the guidance unit 10 externally. A steering controller 12 is also connected to the guidance 32 and steering 46 sensors externally. The steering controller has additional connections to control the vehicle steering manifold 14.

Figure 8:
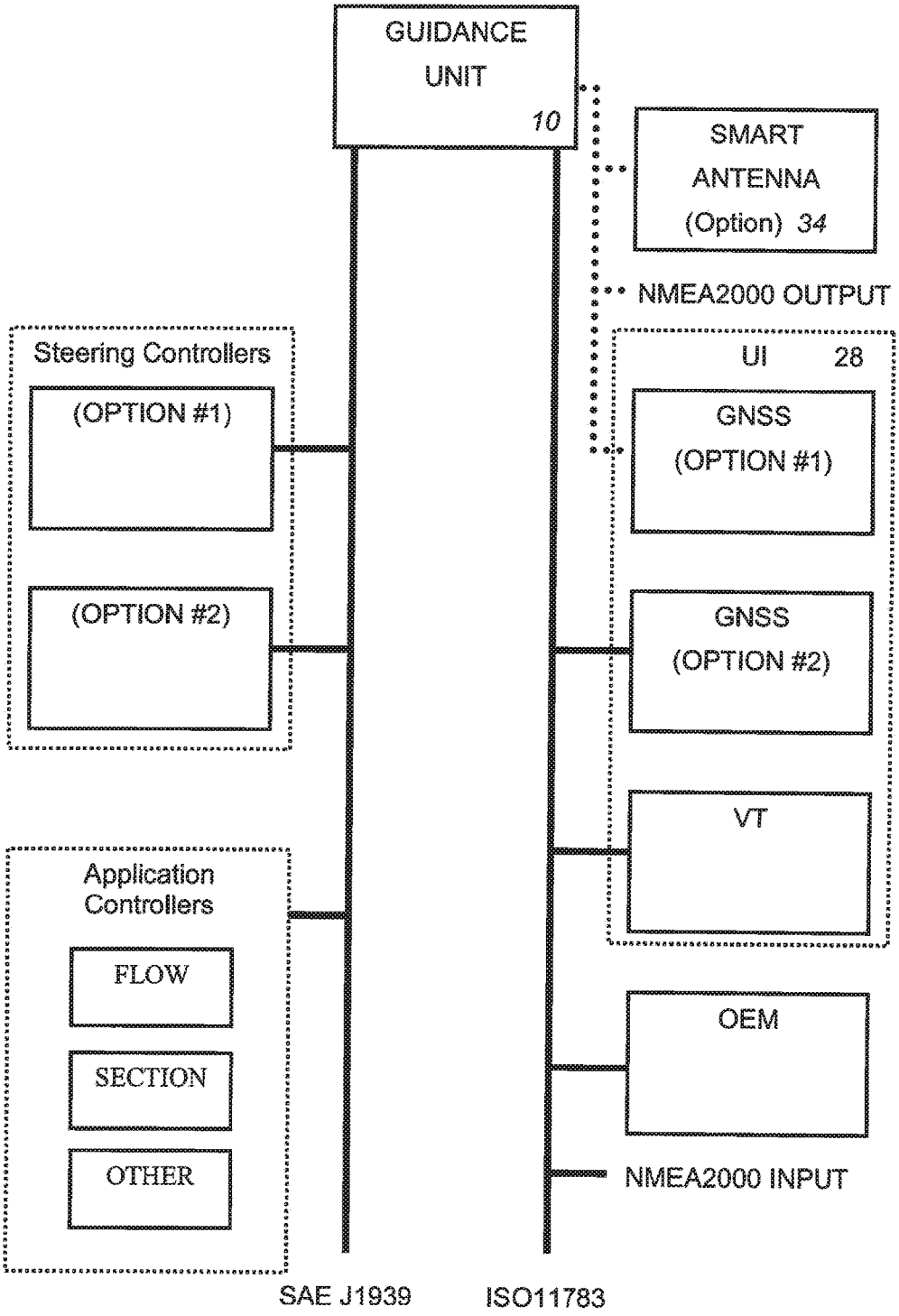
FIG. 8 is an alternative line diagram demonstrating the relationship between devices in an embodiment of the invention.

FIG. 8 demonstrates another alternative example of the present invention. As is typical, the guidance unit 10 is the central element. Two steering controllers 12 are connected to the guidance unit, providing options to the guidance unit. A smart antenna 34, UI 28, and GNSS 8 system are connected to the guidance unit 10 along a first connection, and a second GNSS 8 system, along with a virtual terminal (VT) and/or an original equipment manufacturer (OEM) terminal. These two connections again provide options upon which the guidance unit 10 can make decisions to base path-making and steering choices on.

Figure 9:
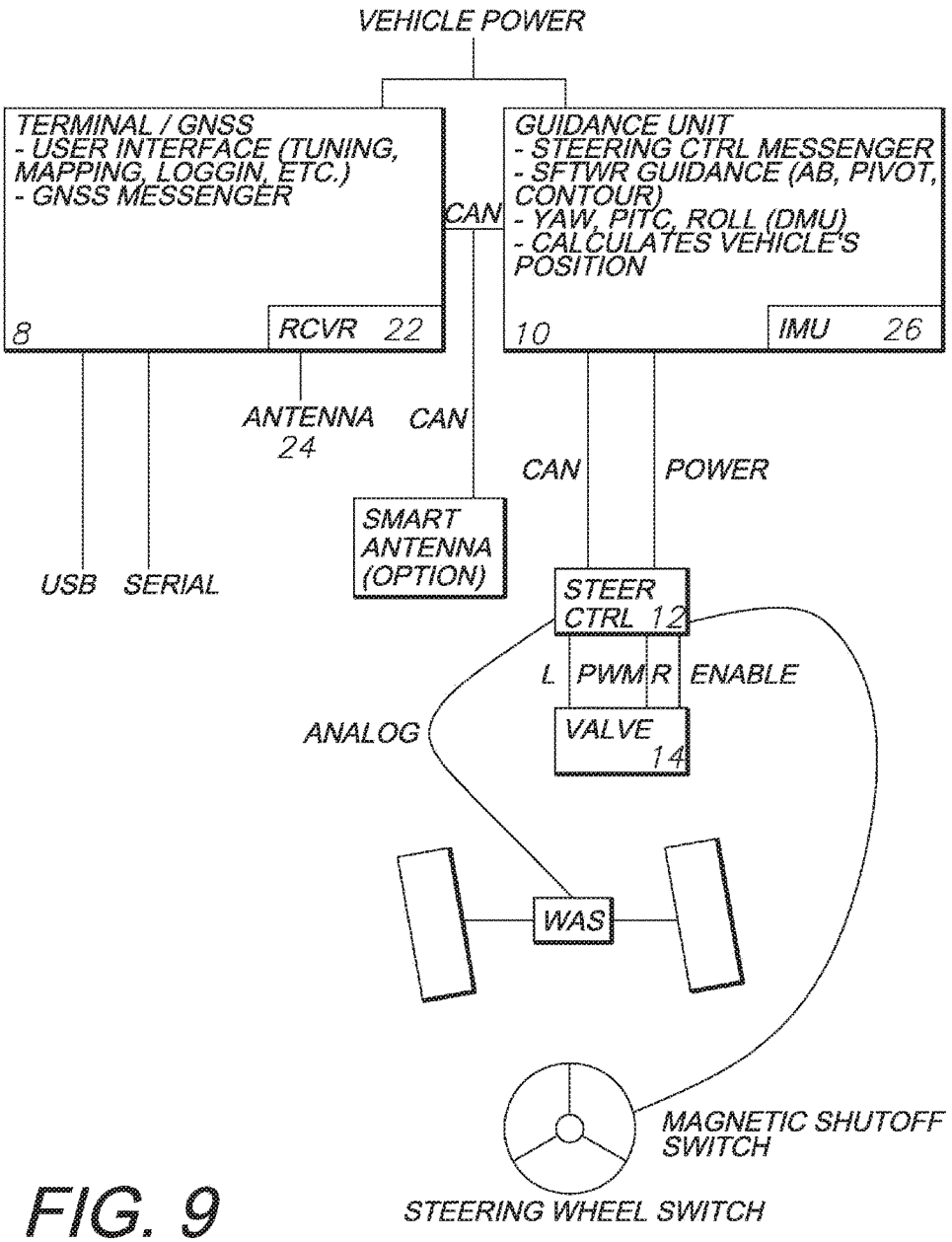
FIG. 9 is an alternative line diagram demonstrating the relationship between devices in an embodiment of the invention.

FIG. 9 demonstrates another example of the present invention generally comprising a kit for installation in an existing vehicle, such as a tractor with a hydraulic steering system. This example is again divided into three main components; the GNSS system 8, the guidance unit 10, and the steering controller 12. The GNSS system 8 includes an internal receiver 22 and at least one external antenna 24, along with various input/output connections. A CAN connection links the GNSS system 8 to the guidance unit 10. The guidance unit includes an internal IMU and an optional connection to an external smart antenna 34. The guidance unit 10 connects to the steering controller 12 through another CAN connection. The steering controller 12 is connected to and controls the vehicle steering valve/manifold 14. An analog connection links the WAS to the steering controller 12. Additionally, several switches are connected to the steering controller that will cancel auto-steer and return the vehicle to manual steering, stopping the vehicle immediately unless the driver is ready to continue. These switches include, but are not limited to, a steering wheel switch that detects when the operator's hand touches the steering wheel, a magnetic shutoff switch that is attached to the operator's seat and can determine if and when the operator stands to leave the seat, and a manual shut-off switch.

*An integrated multi-sensor guidance system for a vehicle assembly including a steering subsystem, which guidance system includes: said vehicle assembly having a dynamic attitude comprising a geo-reference location, vehicle assembly orientation and vehicle assembly speed; a processor with multiple sensor inputs and actuator outputs; a suite of sensor units each connected to a respective sensor input.*

*Said sensor unit suite includes a GNSS unit with an antenna and a receiver connected to said antenna, said GNSS unit providing output signals corresponding to the GNSS-defined locations of said vehicle assembly dynamic attitude to a respective processor input.*

*A guidance controller is adapted for receiving signal input and generating control output based on said signal input; a data storage device including memory storage; and a suite of actuator units each connected to a respective actuator output.*

*Said sensor unit suite includes an inertial measurement unit (IMU) sensor providing output signals corresponding to an inertial aspect of a dynamic attitude of said vehicle assembly to a respective processor input.*

*Said guidance controller is adapted for receiving inertial measurement signals and integrating said inertial measurement signals with said GNSS-based positioning signals. Said processor is programmed to determine variable confidence levels in real time for each said sensor unit based on its current relative performance; and said processor is programmed to utilize said sensor unit outputs proportionally based on their respective confidence levels in generating said control output signals.*

*Said processor is programmed to define multiple behavior-based automatons comprising self-operating entities in said guidance system, said automatons performing respective behaviors using data output from one or more sensor units for achieving said behaviors and wherein one or more sensor units provide the same or similar data.*

*Each said automaton has an accepting interface for accepting requests from other automatons; a requesting interface for making requests to another automaton; a knowledge input for receiving a behavioral definition for affecting the behavior of the automatons; and a data input for receiving input data; and a data output for sending out the data.*

*Said actuator unit suite includes a steering unit connected to said steering subsystem and receiving said control output signals from said processor. Said steering subsystem includes: a steering controller including a steering processor and connected to said guidance controller. Said steering controller receives guidance signals as inputs from said guidance controller and computing steering signals as outputs from said steering controller; and said steering actuator receives said steering signals from said steering controller and steering said vehicle in response thereto.*

*Said sensor suite includes sensor units chosen from among the group comprising: a video camera unit oriented in the vehicle assembly direction of travel; a radar unit; a laser unit; radio input; telemetry; material application exclusion areas input; satellite image inputs; contour/elevation overlay inputs; prescription mapping; and a wheel angle sensor (WAS).*

*Said actuator suite includes actuator units chosen from among the group comprising: an implement steering unit, an implement sectional control unit, personal computer (PC) office software, material application rate control, secondary vehicle control, mapping, crop yield, and mapping skips and overlaps.*

*Said guidance controller is adapted for receiving and storing in said memory storage device GNSS-based positioning signals. Said processor is adapted for computing a GNSS-based guide pattern. Said guidance controller is adapted for providing output signals to a display device for displaying vehicle motion relative to guide patterns and contrasting displays of areas treated by said vehicle along previously-traveled portions of said guide patterns. Said guidance controller is adapted for calibrating and storing in said memory multiple vehicle profiles, each said profile including multiple, independent vehicle-specific automatons.*

*A method of vehicle control and guidance, comprises the steps: providing a vehicle assembly including a steering subsystem and dynamic attitude comprising a geo-reference location, vehicle assembly orientation, and vehicle assembly speed; providing a guidance system including processor with multiple sensor inputs and actuator outputs, a suite of sensor units connected to a respective sensor input, a suite of actuator units connected to a respective actuator output, and a data storage device including memory storage; providing a guidance controller; inputting signal input data to said guidance controller; and generating control output signals with said guidance controller based on said signal input.*

*The sensor unit suite includes an inertial measurement unit (IMU) sensor providing output signals corresponding to an inertial aspect of a dynamic attitude of said vehicle assembly to a respective processor input. The method of vehicle control and guidance also includes generating inertial measurement signals with said IMU sensor; receiving the inertial measurement signals with said guidance controller; and integrating said inertial measurement signals with said GNSS-based positioning signals.*

*The method of vehicle control and guidance also includes determining variable confidence levels with the processor in real time for each said sensor unit based on current relative performance; and utilizing said sensor unit outputs proportionally based on the respective confidence levels in generating said control output signals.*

*The method of vehicle control and guidance also includes defining multiple behavior-based automatons comprising self-operating entities in said guidance system; and instructing said automatons to perform respective behaviors using data output from one or more sensor units for achieving said behaviors wherein one or more sensor units provide the same or similar data.*

*The method of vehicle control and guidance also includes providing each automaton with an accepting interface for accepting requests from other automatons; providing each automaton with a requesting interface for making requests to another automaton; providing each automaton with a knowledge input for receiving a behavioral definition for affecting the behavior of the automatons; providing each automaton with a data input for receiving input data; and providing each automaton with a data output for sending data.*

*The method of vehicle control and guidance also includes providing a steering unit connected to said steering subsystem; and receiving said control output signals at said steering unit as steering control instructions. The method of vehicle control and guidance also includes providing a steering processor connected to said guidance controller; receiving guidance signals at said steering controller as inputs from said guidance controller; computing steering signals as outputs from said steering controller; receiving said steering signals with said steering actuator; and steering said vehicle assembly in response to said steering signals.*

*The method of vehicle control and guidance also includes determining variable confidence levels with the processor in real time for each said sensor unit based on current relative performance; and utilizing said sensor unit outputs proportionally based on the respective confidence levels in generating said control output signals.*

*An integrated multi-sensor guidance system for a vehicle assembly including a steering subsystem, includes: said vehicle assembly having a dynamic attitude comprising a geo-reference location, vehicle assembly orientation and vehicle assembly speed; a processor with multiple sensor inputs and actuator outputs; a suite of sensor units each connected to a respective sensor input.*

*Said sensor unit suite includes a GNSS unit with an antenna and a receiver connected to said antenna, said GNSS unit provides output signals corresponding to the GNSS-defined locations of said vehicle assembly dynamic attitude to a respective processor input; said sensor unit suite includes an inertial measurement unit (IMU) sensor providing output signals corresponding to an inertial aspect of a dynamic attitude of said vehicle assembly to a respective processor input.*

*Said guidance controller is adapted for receiving inertial measurement signals and integrating said inertial measurement signals with said GNSS-based positioning signals; said processor is programmed to determine variable confidence levels in real time for each said sensor unit based on its current relative performance.*

*Said processor is programmed to utilize said sensor unit outputs proportionally based on their respective confidence levels in generating said steering signals; a suite of actuator units are each connected to a respective actuator output; said actuator unit suite includes a steering unit connected to said steering subsystem and receiving said steering signals from said processor.*

*Said processor is programmed to define multiple behavior-based automatons comprising self-operating entities in said guidance system, said automatons performing respective behaviors using data output from one or more sensor units for achieving said behaviors and wherein one or more sensor units provide the same or similar data.*

*Each said automaton has an accepting interface for accepting requests from other automatons; a requesting interface for making requests to another automatons; a knowledge input for receiving a behavioral definition for affecting the behavior of the automatons; a data input for receiving input data; and a data output for sending out the data.*

It will be appreciated that the components of the system 2 can be used for various other applications. Moreover, the subsystems, units and components of the system 2 can be combined in various configurations within the scope of the present invention. For example, the various units could be combined or subdivided as appropriate for particular applications. The system 2 is scalable as necessary for applications of various complexities. It is to be understood that while certain aspects of the disclosed subject matter have been shown and described, the disclosed subject matter is not limited thereto and encompasses various other embodiments and aspects.

Having thus described the disclosed subject matter, what is claimed as new and desired to be secured by Letters Patent is:

1. An integrated multi-sensor guidance system for a vehicle assembly including a steering subsystem, which guidance system includes:

said vehicle assembly having a dynamic attitude comprising a geo-reference location, vehicle assembly orientation and vehicle assembly speed;

a processor with multiple sensor inputs and actuator outputs;

a suite of sensor units each connected to a respective sensor input;

said sensor unit suite includes a GNSS unit with an antenna and a receiver connected to said antenna, *a wheel angle sensor unit* (*WAS*), *and an inertial measurement unit* (*IMU*) *sensor,* said GNSS unit providing output signals corresponding to the GNSS-defined locations of said vehicle assembly dynamic attitude to a respective processor input;

a guidance controller adapted for receiving signal input and generating control output based on said signal input;

a data storage device including memory storage;

a suite of actuator units each connected to a respective actuator output;

said guidance controller being adapted for receiving and storing in said memory storage device GNSS-based positioning signals;

said processor being adapted for computing a GNSS-based. guide pattern;

said guidance controller being adapted for providing output signals to a display device for displaying vehicle motion relative to guide patterns and contrasting displays of areas treated by said vehicle along previously-traveled portions of said guide patterns;

said guidance controller being adapted for calibrating and storing in said memory multiple vehicle profiles, each said profile including multiple, independent vehicle-specific automatons;

an accepting interface for accepting requests from other automatons;

a requesting interface for making requests to another automaton;

a knowledge input for receiving a behavioral definition for affecting the behavior of the automatons;

a data input for receiving input data;

a data output for sending output data;

said processor programmed to determine *different* variable confidence levels in real time for each *of* said [sensor] *GNSS* unit, *WAS, and IMU sensor* based on its current relative performance;

said processor programmed to utilize said [sensor] *GNSS* unit, *WAS, and IMU sensor* outputs proportionally based on their respective confidence levels in generating said control output signals; and wherein said processor is programmed to define multiple behavior-based automatons comprising self-operating entities in said guidance system, said automatons performing respective behaviors using data output from said [one or more sensor units] *GNSS unit, said WAS, and said IMU sensor* for achieving said behaviors and wherein said [one or more sensor units] *GNSS unit, WAS, and IMU sensor* provide *at least some of* the same or similar data.

2. The guidance system as claimed in claim 1, wherein [said sensor unit suite includes an inertial measurement unit (IMU) sensor providing output signals corresponding to an inertial aspect of a dynamic attitude of said vehicle assembly to a respective processor input] *said guidance controller sends steering control instructions instructing said automatons to perform respective behaviors using data output from one or more GNSS unit, WAS, and IMU sensor.*

3. The guidance system as claimed in claim [2] *1*, wherein said guidance controller is adapted for receiving inertial measurement signals *from the IMU* and integrating said inertial measurement signals with said GNSS-based positioning signals.

4. The guidance system as claimed in claim 1, wherein said. actuator unit suite includes a steering unit connected to said steering subsystem and receiving said control output signals from said processor.

5. The guidance system as claimed in claim 4, wherein said steering subsystem includes:

a steering controller including a steering processor and connected to said guidance controller;

said steering controller receiving guidance signals as inputs from said guidance controller and computing steering signals as outputs from said steering controller; and said steering actuator receiving said steering signals from said steering controller and steering said vehicle in response thereto.

6. The guidance system as claimed in claim 1, wherein said sensor suite includes sensor units chosen from among the group comprising:

a video camera unit oriented in the vehicle assembly direction of travel;

a radar unit;

a laser unit;

radio input;

telemetry;

[material application exclusion areas input;]

satellite image inputs; *and*

[contour/elevation overlay inputs;]

prescription mapping[; and a wheel angle sensor (WAS)].

7. The guidance system as claimed in claim 1, wherein said actuator suite includes actuator units chosen from among the group comprising:

an implement steering unit, an implement sectional control unit, personal computer (PC) office software, material application rate control, secondary vehicle control, mapping, crop yield, and mapping skips and overlaps.

8. A method of vehicle control and guidance, which method comprises the steps:

providing a vehicle assembly including a steering subsystem and dynamic attitude comprising a geo-reference location, vehicle assembly orientation, and vehicle assembly speed;

providing a guidance system including a processor with multiple sensor inputs and actuator outputs, a suite of sensor units connected to a respective sensor input, a suite of actuator units connected to a respective actuator output, and a data storage device including memory storage;

providing a guidance controller;

inputting signal input data to said guidance controller;

generating control output signals with said guidance controller based on said signal input;

receiving and storing in said memory storage device GNSS-based positioning signals with said guidance controller;

computing a GNSS-based guide pattern with said processor;

providing output signals with said guidance controller to a display device for displaying vehicle motion relative to guide patterns and contrasting displays of areas treated by said vehicle along previously-traveled portions of said guide patterns;

calibrating and storing in said memory multiple vehicle profiles with said guidance controller, each said profile including multiple, independent vehicle-specific automatons;

wherein said sensor unit suite includes an inertial measurement unit (IMU) sensor providing output signals corresponding to an inertial aspect of a dynamic attitude of said vehicle assembly to a respective processor input;

generating inertial measurement signals with said IMU sensor;

receiving the inertial measurement signals with said guidance controller;

integrating said inertial measurement signals with said GNSS-based positioning signals;

defining multiple behavior-based automatons comprising self-operating entities in said guidance system;

instructing said automatons to perform respective behaviors using data output from one or more sensor units for achieving said behaviors wherein one or inure sensor units provide the same or similar data;

providing each automaton with an accepting interface for accepting requests from other automatons;

providing each automaton with a requesting interface for making requests to another automaton;

providing each automaton with a knowledge input for receiving a behavioral definition for affecting the behavior of the automatons;

providing each automaton with a data input for receiving input data;

providing each automaton with a data output for sending data; requesting instructions by each automaton from each other automaton; and accepting instructions by each automaton provided from each other automaton.

9. A method of vehicle control and guidance as claimed by claim 8, including the steps:

determining variable confidence levels with the processor in real time for each said sensor unit based on current relative performance; and utilizing said sensor unit outputs proportionally based on the respective confidence levels in generating said control output signals.

10. A method of vehicle control and guidance as claimed by claim 8, including the steps:

providing a steering unit connected to said steering system; and receiving said control output signals at said steering unit as steering control instructions.

11. A method of vehicle control and guidance as claimed by claim 10, including the steps:

providing a steering processor connected to said guidance controller;

receiving guidance signals at said steering controller as inputs from said guidance controller;

computing steering signals as outputs from said steering controller;

receiving said steering signals with said steering actuator; and steering said vehicle assembly in response to said steering signals.

12. An integrated multi-sensor guidance system for a vehicle [assembly including a steering subsystem, which guidance system includes], *comprising*:

[said vehicle assembly having a dynamic attitude comprising a geo-reference location, vehicle assembly orientation and vehicle assembly speed;]

a processor with multiple sensor inputs and actuator outputs;

a suite of sensor units each connected to a respective sensor input;

[said sensor unit suite including a GNSS unit with an antenna and a receiver connected to said antenna, said GNSS unit providing output signals corresponding to the GNSS-defined locations of said vehicle assembly dynamic attitude to a respective processor input;

said sensor unit suite including an inertial measurement unit (IMU) sensor providing output signals corresponding to an inertial aspect of a dynamic altitude of said vehicle assembly to a respective processor input;

said guidance controller being adapted for receiving said inertial measurement signals and integrating said inertial measurement signals with said GNSS-based positioning signals;]

said processor being programmed to determine variable confidence levels in real time for each said sensor unit based on its current relative performance;

said processor being programmed to utilize [said] sensor unit outputs proportionally based on their respective confidence levels in generating [said] steering signals;

[a suite of actuator units each connected to a respective actuator output;

said actuator unit suite including a steering unit connected to said steering subsystem and receiving said steering signals from said processor;]

said processor being programmed to define multiple behavior-based automatons comprising self-operating entities in said guidance system, said automatons performing respective behaviors using data output from one or more said sensor units for achieving said behaviors and wherein said one or more sensor units provide the same or similar data;

each said automaton having:

an accepting interface for accepting requests from other automatons;

a requesting interface for making requests to another automatons;

a knowledge input for receiving a behavioral definition for affecting the behavior of the automatons;

a data input for receiving input data; and a data output for sending out the data;

[said guidance controller being adapted for receiving and storing] *the same or another processor further configured to:*

*receive and store* in [said] *a* memory storage device *global navigation satellite system* (GNSS)-based positioning signals *and inertial measurement signals from an inertial measurement unit* (*IMU*) *sensor;*

[said processor being adapted for computing] *compute* a GNSS-based guide pattern;

[said guidance controller being adapted for providing] *provide* output signals to a display device [for displaying] *to display* vehicle motion *for the vehicle* relative to [guide patterns] *the guide pattern* and [contrasting] *to contrast* displays of areas treated by [said] *the* vehicle along previously-traveled portions of [said] *the* guide [patterns] *pattern*; [and]

[said guidance controller being adapted for calibrating and storing] *calibrate and store* in [said] *the* memory *storage device* multiple vehicle profiles, each said profile including multiple, independent vehicle-specific automatons.

*13. A guidance system for operating multiple vehicles, the guidance system including a guidance controller to:*

*receive and store in a memory storage device data from sensor units located on a first vehicle including velocity, acceleration and GNSS-based position data derived from a wheel angle sensor (WAS), inertial measurement unit (IMU), and global navigation satellite system (GNSS);*

*determine variable confidence levels in real time the said sensor units based on its current relative performance;*

*define multiple behavior-based automatons comprising self-operating entities in said guidance system, said automatons performing respective behaviors using data output from said one or more sensor units for achieving said behaviors and wherein said one or more sensor units provide the same or similar data;*

*each said automaton having:*

*an accepting interface for accepting requests from other automatons;*

*a requesting interface for making requests to another automatons;*

*a knowledge input for receiving a behavioral definition for affecting the behavior of the automatons;*

*a data input for receiving input data; and*

*a data output for sending out the data;*

*calibrate and store in the memory storage device multiple vehicle profiles, each said profile including multiple, independent vehicle-specific automatons;*

*compute a guide path for the first vehicle from at least the GNSS-based position data;*

*send the GNSS-based position data to a display device to display movement of the first vehicle relative to the guide path;*

*provide output signals to the display device to display vehicle motion for the first vehicle relative to the guide path and to contrast displays of areas treated by the first vehicle along previously-traveled portions of the guide path;*

*store in the memory storage device a vehicle profile for a second vehicle;*

*send guidance instructions to the second vehicle to use data output from one or more of the sensor units that provide the same position data as derived from the GNSS, WAS, and IMU to control movement of the second vehicle in cooperation with movement of the first vehicle along the guide path; and*

*update the guidance instructions to the second vehicle based on computed differences in the position data of the first vehicle.*

*14. An integrated multi-sensor guidance system comprising a guidance controller to:*

*receive signals from different sensor units including a global navigation satellite system (GNSS)-based sensor unit, a wheel angle sensor (WAS), and an inertial measurement unit (IMU) sensor providing positions for a vehicle;*

*define multiple behavior-based automatons comprising self-operating entities in said guidance system performing respective behaviors using data output from the sensor units and wherein said sensor units provide at least some same or similar data, each said automaton having:*

*an accepting interface for accepting requests from other automatons;*

*a requesting interface for making requests to another automatons;*

*a knowledge input for receiving a behavioral definition for affecting the behavior of the automatons;*

*a data input for receiving input data; and*

*a data output for sending out the data;*

*calibrate and store in a memory storage device multiple vehicle profiles, each said profile including multiple, independent vehicle-specific automatons;*

*compute a GNSS-based guide path for the vehicle;*

*determine variable confidence levels in real-time for the GNSS-based sensor unit, the WAS, and the IMU sensor based on current relative performance of the sensor units;*

*use output signals from a first one of the sensor units with a highest one of the confidence levels to provide output signals to determine movements of the vehicle relative to the guide path;*

*use output signals from the first one of the sensor units with the highest one of the confidence levels to calibrate a second one of the sensor units with a lower one of the confidence levels; and*

*provide output signals to a display device to display vehicle motion for the vehicle relative to the guide path and to contrast displays of areas treated by the vehicle along previously-traveled portions of the guide path.*

* * * * *